United States Patent
Mizrahi

(10) Patent No.: US 10,205,547 B2
(45) Date of Patent: Feb. 12, 2019

(54) CLOCK SYNCHRONIZATION USING MULTIPLE NETWORK PATHS

(71) Applicant: Marvell Israel (M.I.S.L) Ltd., Yokneam (IL)

(72) Inventor: Tal Mizrahi, Haifa (IL)

(73) Assignee: Marvell Israel (M.I.S.L) Ltd., Yokneam (IL)

(*) Notice: Subject to any disclaimer, the term of this patent is extended or adjusted under 35 U.S.C. 154(b) by 0 days.

(21) Appl. No.: 15/797,695

(22) Filed: Oct. 30, 2017

(65) Prior Publication Data

US 2018/0048409 A1    Feb. 15, 2018

Related U.S. Application Data

(63) Continuation of application No. 13/890,921, filed on May 9, 2013, now Pat. No. 9,806,835, which is a
(Continued)

(51) Int. Cl.
*H04J 3/06* (2006.01)

(52) U.S. Cl.
CPC .......... *H04J 3/0602* (2013.01); *H04J 3/0664* (2013.01); *H04J 3/0667* (2013.01)

(58) Field of Classification Search
CPC ...... H04J 3/0602; H04J 3/0667; H04J 3/0664; H04J 3/0658; H04J 3/0673; H04J 3/0661; H04J 3/0679; H04J 3/06
See application file for complete search history.

(56) References Cited

U.S. PATENT DOCUMENTS

| 4,009,347 A | 2/1977 | Flemming |
| 6,360,271 B1 | 3/2002 | Schuster et al. |

(Continued)

FOREIGN PATENT DOCUMENTS

| DE | 10 2008026391 | 12/2009 |
| EP | 2254267 | 11/2010 |

(Continued)

OTHER PUBLICATIONS

Second Office Action in Chinese Patent Application No. 2013800249412, dated Oct. 25, 2017, with English translation (6 pages).
(Continued)

*Primary Examiner* — Kabir A Timory

(57) ABSTRACT

A network device includes one or more ports coupled to a network, a path determination module, and a clock synchronization module. The one or more ports receive a plurality of time synchronization packets from a master clock device. The path determination module identifies, based on respective path information included in each of at least some of the plurality of time synchronization packets, particular communication paths among two or more communication paths between the master clock device and the network device, via which the respective time synchronization packets traveled from the master clock device to the network device. The clock module determines a system time clock based on respective time information included in the at least some of the plurality of time synchronization packets and the identifications of the particular communication paths via which the respective time synchronization packets traveled from the master clock device to the network device.

20 Claims, 11 Drawing Sheets

Related U.S. Application Data continuation-in-part of application No. 13/764,732, filed on Feb. 11, 2013, now Pat. No. 9,172,485.

(60) Provisional application No. 61/644,722, filed on May 9, 2012, provisional application No. 61/647,173, filed on May 15, 2012, provisional application No. 61/647,123, filed on May 15, 2012, provisional application No. 61/695,371, filed on Aug. 31, 2012, provisional application No. 61/695,367, filed on Aug. 31, 2012, provisional application No. 61/706,526, filed on Sep. 27, 2012, provisional application No. 61/713,818, filed on Oct. 15, 2012, provisional application No. 61/597,092, filed on Feb. 9, 2012.

(56) References Cited

U.S. PATENT DOCUMENTS

| | | | |
|---|---|---|---|
| 6,363,416 | B1 | 3/2002 | Naeimi |
| 7,277,954 | B1 | 10/2007 | Stewart et al. |
| 7,447,931 | B1 | 11/2008 | Rischar |
| 7,876,791 | B2 | 1/2011 | Jung et al. |
| 7,990,909 | B2 | 8/2011 | Brueckheimer |
| 8,483,244 | B2 | 7/2013 | Rahbar |
| 8,483,271 | B2 | 7/2013 | Chen et al. |
| 8,644,348 | B2 | 2/2014 | Zampetti |
| 8,675,502 | B2 | 3/2014 | Blair |
| 8,730,868 | B2 | 5/2014 | Yamada et al. |
| 8,769,046 | B2 | 7/2014 | Knapp et al. |
| 8,774,227 | B2 | 7/2014 | Rahbar |
| 9,036,481 | B1 | 5/2015 | White |
| 9,112,630 | B1 | 8/2015 | Mizrahi |
| 9,172,485 | B2 | 10/2015 | Mizrahi |
| 9,209,920 | B2 | 12/2015 | Mizrahi et al. |
| 9,806,835 | B2 | 10/2017 | Mizrahi |
| 2003/0140172 | A1 | 7/2003 | Woods |
| 2005/0073961 | A1 | 4/2005 | Paik |
| 2005/0152330 | A1 | 7/2005 | Stephens et al. |
| 2005/0185621 | A1 | 8/2005 | Sivakumar |
| 2005/0281204 | A1 | 12/2005 | Karol |
| 2006/0218298 | A1 | 9/2006 | Knapp et al. |
| 2007/0140273 | A1 | 6/2007 | Kubota |
| 2008/0072035 | A1 | 3/2008 | Johnson |
| 2009/0147806 | A1 | 6/2009 | Brueckheimer |
| 2009/0190482 | A1 | 7/2009 | Blair |
| 2009/0262667 | A1 | 10/2009 | Kobayashi |
| 2009/0304007 | A1 | 12/2009 | Tanaka |
| 2010/0020909 | A1 | 1/2010 | Jung et al. |
| 2010/0296406 | A1 | 11/2010 | Rahbar |
| 2010/0296524 | A1 | 11/2010 | Rahbar |
| 2011/0051754 | A1 | 3/2011 | Lansdowne |
| 2011/0122775 | A1* | 5/2011 | Zampetti .............. H04J 3/0641 370/242 |
| 2011/0150008 | A1* | 6/2011 | Le Pallec ............ H04L 41/5003 370/503 |
| 2011/0222412 | A1 | 9/2011 | Kompella |
| 2012/0269204 | A1 | 10/2012 | Zampetti |
| 2012/0275501 | A1* | 11/2012 | Rotenstein ............ H04J 3/0667 375/220 |
| 2013/0077509 | A1 | 3/2013 | Hirota |
| 2013/0208735 | A1 | 8/2013 | Mizrahi et al. |
| 2013/0216218 | A1 | 8/2013 | Cao |
| 2013/0223458 | A1 | 8/2013 | Bui |
| 2013/0259049 | A1 | 10/2013 | Mizrahi |
| 2014/0016143 | A1 | 1/2014 | Morovic et al. |
| 2014/0149526 | A1 | 5/2014 | Magee |
| 2014/0161143 | A1 | 6/2014 | Mizrahi et al. |

FOREIGN PATENT DOCUMENTS

| | | |
|---|---|---|
| WO | WO-2012-065823 | 5/2012 |
| WO | WO-2013/117997 A2 | 8/2013 |
| WO | WO-2013/167977 | 11/2013 |

OTHER PUBLICATIONS

ITU-T G.8275/Y.1369, "Series G: Transmission Systems and Media, Digital Systems and Networks: Packet over Transport Aspects—Quality and availability targets—Architecture and requirements for packet-based time and phase distribution," *International Telecommunication Union*, 30 pages (Nov. 2013).

Augustin, Brice, et al., "Measuring Load-balanced Paths in the Internet," Internet Measurement Conference 2007 (IMC '07), San Diego, California, 12 pages (Oct. 2007).

Augustin, Brice, et al., Measuring Multipath Routing in the Internet, *IEEE/ACM Transactions on Networking*, Vo.. 19, No. 3, pp. 830-840 (Jun. 2011).

He, Yihua, et al., "On Routing Asymmetry in the Internet," *Global Telecommunications Conference 2005 (GLOBECOM '05)*, IEEE vol. 2, 7 pages (Nov. 2005).

Mills, David L., "Improved Algorithms for Synchronizing Computer Network Clocks 1,2," *Association for Computing Machinery*, 11 pages (1994).

Mills, David L., "Internet Time Synchronization: the Network Time Protocol 1,2," IEEE Transactions on Communications, 14 pages.

Mizrahi, Tal, "Security Requirements of Time Synchronization Protocols in Packet Switched Networks," TICTOC Working Group, Internet Draft, 32 pages (Feb. 7, 2013).

Mizrahi, et al., U.S. Appl. No. 13/890,945, entitled "Clock Synchronization in the Presence of Security Threats," filed May 9, 2013.

Narasimhan, Janardhanan, et al., "Traceflow," Internet Draft, 43 pages (Jan. 23, 2012).

Pathak, Abhinav, et al., A Measurement Study of Internet Delay Asymmetry, U.S. Appl. No. *Passive and Active Network Measurement, 9th International Conference, PAM 2008*, Cleveland, OH, 10 pages (Apr. 2008).

"ptpv2d Project Home Information," pp. 1-3 (2010).

Office Action in U.S. Appl. No. 13/890,945, dated Oct. 30, 2014 (13 pages).

International Preliminary Report on Patentability for International Application No. PCT/IB2013/001506, dated Nov. 20, 2014 (12 pages).

International Search Report and Written Opinion for International Application No. PCT/IB2013/000633, dated Oct. 16, 2013.

International Preliminary Report on Patentability for International Application No. PCT/IB2013/000633, dated Aug. 12, 2014 (12 pages).

Notice of Allowance in U.S. Appl. No. 13/890,945, dated Apr. 8, 2015 (9 pages).

Office Action in U.S. Appl. No. 13/764,732, dated Aug. 29, 2014 (18 pages).

Notice of Allowance in U.S. Appl. No. 13/764,732, dated Jan. 7, 2015 (9 pages).

Notice of Allowance in U.S. Appl. No. 13/764,732, dated Jun. 25, 2015 (5 pages).

Office Action in U.S. Appl. No. 14/175,858, dated Jan. 30, 2015 (17 pages).

Notice of Allowance in U.S. Appl. No. 14/175,858, dated Aug. 3, 2015 (15 pages).

IEEE Std 802.10, 2003 Edition, "IEEE Standards for Local and Metropolitan area networks—Virtual Bridged Local Area Networks," *The Institute of Electrical and Electronics Engineers, Inc.*, 327 pages (May 7, 2003).

IEEE Std 802.1Q-2011 (Revision of IEEE Std.802.1Q-2005), "IEEE Standard for Local and Metropolitan Area Networks—Media Access Control (MAC) Bridges and Virtual Bridged Local Area Networks," The Institute of Electrical and Electronics Engineers, Inc., 1,365 pages (Aug. 31, 2011).

IEEE P802.1ad/D6.0, Draft Amendment to IEEE Std 802.1Q, "IEEE Draft Standard for Local and Metropolitan Area Networks—Virtual Bridged Local Area Networks—Amendment 4: Provider Bridges," *The Institute of Electrical and Electronics Engineers, Inc.*, 60 pages, (Aug. 17, 2005).

(56) References Cited

OTHER PUBLICATIONS

IEEE P1588TM D2.2 "Draft Standard for a Precision Clock Synchronization Protocol for Networked Measurement and Control Systems," The Institute of Electrical and Electronics Engineers, Inc., 2008.

IEEE Std. 1588TM-2008 (Revision of IEEE Std. 1588-2002), "IEEE Standard for a Precision Clock Synchronization Protocol for Networked Measurement and Control Systems," *The Institute for Electrical and Electronics Engineers, Inc.*, IEEE Standard, pp. 1-289 (Jul. 24, 2008).

Weber et al., "High availability seamless automation ring (Draft IEC 62439-3) and IEEE 1588 time sync dependencies," *Institute for Electrical and Electronics Engineers, Inc*, pp. 1-7 (Oct. 2010).

Mizrahi, "Slave Diversity: Using Multiple Paths to Improve the Accuracy of Clock Synchronization Protocols," 2012 IEEE Int'l Symposium on Precision Clock Synchronization for Measurement, Control, and Communication (ISPCS), pp. 1-6 (Sep. 24, 2012).

Mizrahi, T., "A Game Theoretic Analysis of Delay Attacks against Time Synchronization Protocols," Precision Clock Synchronization for Measurement, Control and Communication (ISPCS), International IEEE Symposium (2012).

Office Action in Chinese Patent Application No. 201380024941.2, dated Feb. 27, 2017, with English translation (14 pages).

Abdul et al., "Integration of HSR and IEEE1588 over Ethernet networks," Proc. Of the 2010 Int'l IEEE Symposium on Precision Clock Synchronization for Measurement, Control and Communication, pp. 77-82 (Sep. 27-Oct. 1, 2010).

Abstract of IEEE 802.1AS Standard, "802.1AS—Timing and Synchronization," The Institute of Electrical and Electronics Engineers, Inc., available at <http://www.ieee802.org/1/pages/802.1as.html>, (Nov. 11, 2010).

Alizadeh et al., "DCTCP: Efficient packet transport for the commoditized data center," SIGCOMM, 2010.

Appenzeller et al., "Sizing router buffers," SIGCOMM, 2004.

Chin et al., "IEEE 1588 Clock Synchronization using Dual Slave Clocks in a Slave," IEEE Communications Letters, vol. 13, Issue 6, pp. 456-458, 2009.

Corlett et al. "Statistics of One.cndot. Way Internet Packet Delays", IETF, draft-corlett-statistics-of-packet.cndot.delays-00 (work in progress), 2002.

Gurewitz et al., "Estimating One-Way Delays from Cyclic-Path Delay Measurements," IEEE INFOCOM, vol. 2. pp. 1038-1044, 2001.

Gurewitz et al., "One-Way Delay Estimation Using Network Wide Measurements," IEEE Transactions on Information Theory, vol. 52, Num. 6, pp. 2710-2724, 2006.

IEC 62439-3, "Industrial communication networks—High availability automation networks—Part 3: Parallel Redundancy Protocol (PRP) and High-availability Seamless Redundancy (HSR)," 2010.

IEEE 802.1AS/IEEE 1588 version 2, Precision Timing Protcol supporting software timestamping on Linux & Windows, HW Timestamping on the Freescale MPC831X, pp. 1-3 (Feb. 2003).

IEEE P802.1AS/D0.8, "Draft Standard for Local and Metropolitan Area Networks-Timing and Synchronization for Time-Sensitive Applications in Bridged Local Area Networks," *The Institute of Electrical and Electronics Engineers, Inc.* (May 25, 2007).

IEEE Std 802.11e/D11.0, "IEEE Standard for Information technology—Telecommunications and information exchange between systems—Local and metropolitan area networks—Specific requirements, Part 11: Wireless Medium Access Control (MAC) and PhysicalLayer (PHY) Specifications: Amendment 7: Medium Access Control (MAC) Quality of Service (QoS) Enhancements," The Institute of Electrical and Electronics Engineers, Inc., Oct. 2004.

IEEE Std. C37.238, "IEEE Standard Profile for Use of IEEE 1588 Precision Time Protocol in Power System Applications," 2011.

IEEE TC 9 Test and Measurement Society 2000, "1588 IEEE Standard for a Precision Clock Synchronization Protocol for Networked Measurement and Control Systems Version 2," IEEE Standard, 2008.

International Search Report in PCT/IB2013/001506 dated Oct. 30, 2013.

Lee, "An enhanced IEEE 1588 time synchronization algorithm for asymmetric communication link using block burst transmission", IEEE Commun. Lett., vol. 12, No. 9, pp. 687-689, Sep. 2008.

Linux Foundation, http://www/linuxfoundation.org/collaborate/workgroups/networking/netem (Feb. 2013).

Lv et al., "An enhanced IEEE 1588 time synchronization algorithm for asymmetric communication link in packet transport network," IEEE Trans. on Comm., vol. 14. No. 8. pp. 764-766, Aug. 2010.

Mills et al., "Network Time Protocol Version 4: Protocol and Algorithms Specification," IETF, RFC 5905, 2010.

Mukherjee, "On the Dynamics and Signicance of Low Frequency Components of Internet Load," Internetworking: Research and Experience. vol. 5. No. 4. pp. 163-205, 1994.

Paxson, "End-to-end internet packet dynamics," IEEE/ACM Transactions on Networking, vol. 7(3), pp. 277-292, 1999.

Salnex Solutions—Paragon-X, http://www.colnexsol.com/products/paragon-x, (2010).

Shpiner et al., "Multi-Path Time Synchronization," Internet Engineering Task Force, IETF, Standard Working Draft, Internet Society (ISOC) Geneva, Switzerland, Oct. 15, 2012.

Simanic et al., "Compensation of Asymmetrical Latency for Ethernet Clock Synchronization," International Symposium for Precision Clock Synchronization for Measurement Control and Communication, ISPCS 2011, pp. 19-24, 2011.

Tournier et al., "Precise Time Synchronization on a High Available Redundant Ring Protocol," ISPCS 2009 International IEEE Symposium on Precision Clock Synchronization for Measurement, Control and Communication, Brescia, Italy, Oct. 12-16, 2009.

Weighted mean, http://en.wikipedia.org/wiki/Weighted.sub.—mean, pp. 1-10 (Feb. 2013).

Written Opinion in PCT/IB2013/001506 mailed Oct. 30, 2013.

Zarick et al., "The Impact of Network Latency on the Synchronization of Real.cndot.World IEEE 1588-2008 Devices," in Proc. of the 2010 International IEEE Symposium on Precision Clock Synchronization for Measurement. Control and Communication, 2010.

Zhang et al., "PDV-based PTP LSP Setup, Reoptimization and Recovery," work in progress, IETF, draft-zhang-tictoc-pdv-lsp, 2011.

* cited by examiner

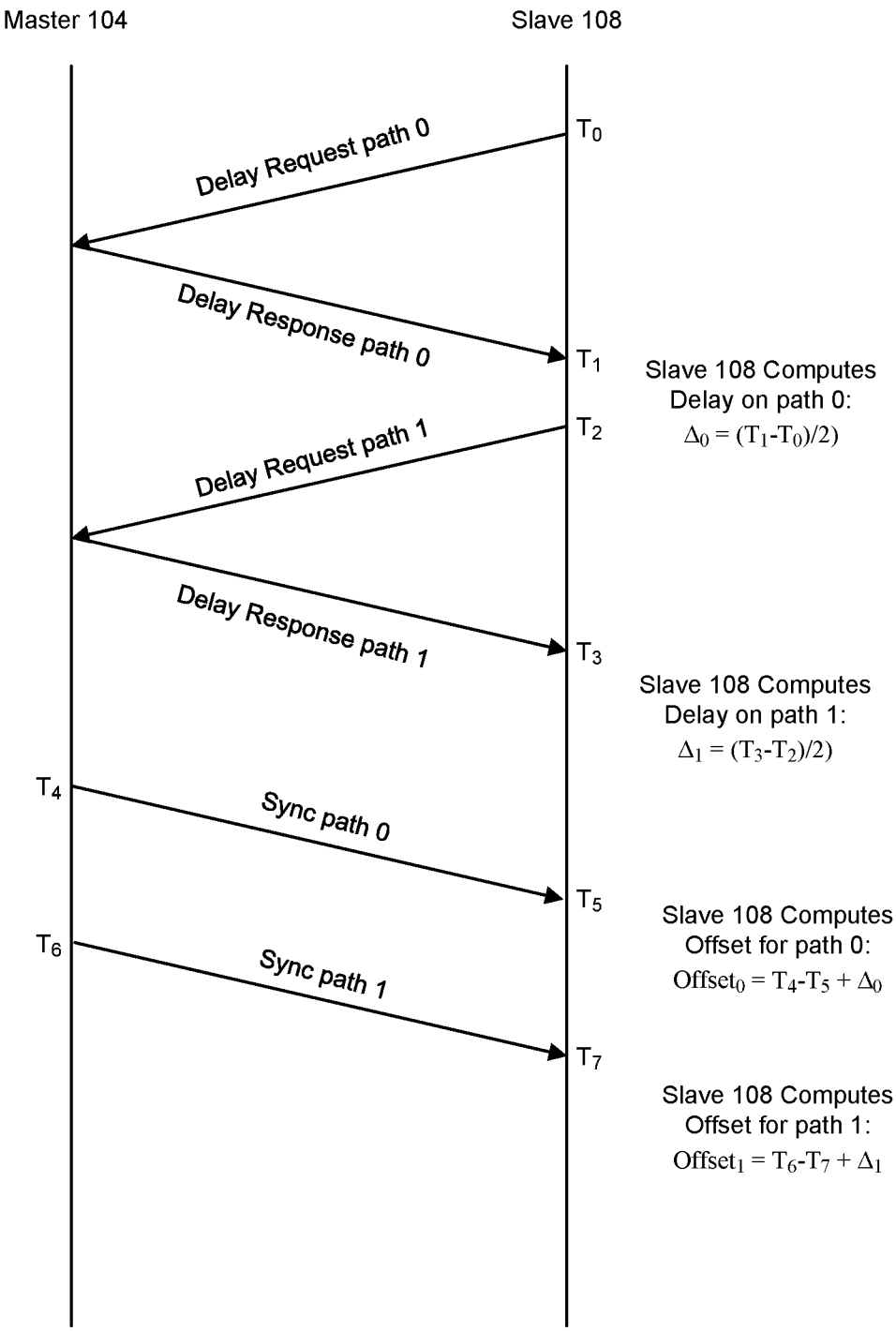

CLOCK SYNCHRONIZATION USING MULTIPLE NETWORK PATHS

CROSS-REFERENCES TO RELATED APPLICATIONS

This disclosure is a continuation of U.S. patent application Ser. No. 13/890,921, entitled "Clock Synchronization Using Multiple Network Paths," filed on May 9, 2013, which claims the benefit of:

U.S. Provisional Patent Application No. 61/644,722, entitled "Slave Diversity: Using Multiple Paths to Improve the Accuracy of Clock Synchronization Protocols," filed on May 9, 2012;

U.S. Provisional Patent Application No. 61/647,123, entitled "Slave Diversity: Using Multiple Paths to Improve the Accuracy of Clock Synchronization Protocols," filed on May 15, 2012;

U.S. Provisional Patent Application No. 61/647,173, entitled "Running PTP Over Multiple Paths: A Proposed Extension to the IEEE 1588," filed on May 15, 2012;

U.S. Provisional Patent Application No. 61/695,367, entitled "Multi-Path Time Protocols," filed on Aug. 31, 2012;

U.S. Provisional Patent Application No. 61/695,371, entitled "Multi-Masters Precision Time Protocols," filed on Aug. 31, 2012; and U.S. Provisional Patent Application No. 61/706,526, entitled "Multi-Path Time Protocols," filed on Sep. 27, 2012.

U.S. Provisional Patent Application No. 61/713,818, entitled "Running PTP Over Multiple Paths: A Proposed Extension to the IEEE 1588," filed on Oct. 15, 2012;

Additionally, U.S. patent application Ser. No. 13/890,921, entitled "Clock Synchronization Using Multiple Network Paths," filed on May 9, 2013 is a continuation-in-part of U.S. patent application Ser. No. 13/764,732, entitled "Clock Synchronization Using Multiple Network Paths," filed on Feb. 11, 2013, which claims the benefit of, inter alia, U.S. Provisional Patent Application No. 61/597,092, entitled "Time Synchronization Diversity," filed on Feb. 9, 2012.

The disclosures of all of the above-referenced applications are incorporated herein by reference in their entireties.

FIELD OF THE DISCLOSURE

The present disclosure relates generally to devices that maintain a clock and, more particularly, to techniques for synchronizing clocks across a network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Clock synchronization protocols are commonly used in packet-based networks to synchronize clocks maintained at different network devices. In such clock synchronization protocols, a first network device, which maintains a master clock, transmits a protocol message including a master clock time to a second network device, which maintains a slave clock. The second network device utilizes the master clock time and an estimated network latency to adjust the slave clock in order to synchronize the slave clock with the master clock.

SUMMARY

In an embodiment, a network device comprises one or more ports coupled to a network. The one or more ports are configured to receive a plurality of time synchronization packets from a master clock device, the plurality of time synchronization packets for synchronization of a system time clock in the network device with the master clock device. The network device also comprises a path determination module implemented on one or more integrated circuit devices configured to identify, based on respective path information included in each of at least some of the plurality of time synchronization packets, particular communication paths among two or more communication paths between the master clock device and the network device, via which the respective time synchronization packets traveled from the master clock device to the network device. The network device further comprises a clock module implemented on the one or more integrated circuit devices configured to determine a value of the system time clock based on (i) respective time information included in the at least some of the plurality of time synchronization packets and (ii) the identifications of the particular communication paths via which the respective time synchronization packets traveled from the master clock device to the network device.

In another embodiment, a method includes receiving a plurality of time synchronization packets from a master clock device over two or more different communication paths via one or more ports coupled to a network. The time synchronization packets, of the plurality of time synchronization packets, are for synchronization of a system time clock in a network device with the master clock device. Each time synchronization packet includes (i) respective path information, and (ii) respective time information, wherein the respective path information indicates a respective communication path in the network via which the respective time synchronization packet was received. The method also includes identifying, based on respective path information included in each of at least some of the plurality of time synchronization packets, particular communication paths among the two or more different communication paths between the master clock device and the network device, via which the respective time synchronization packets traveled from the master clock device to the network device. The method further includes determining a value of the system time clock based on (i) respective time information included in the at least some of the plurality of time synchronization packets and (ii) the identifications of the particular communication paths via which the respective time synchronization packets traveled from the master clock device to the network device.

In yet another embodiment, a system comprises a first network device. The first network device includes one or more first ports coupled to a communication network, and one or more integrated circuit devices configured to generate a plurality of time synchronization packets for synchronization of a system time clock in a network device with a master clock, each time synchronization packet having (i) respective path information, and (ii) respective time information, wherein the respective path information indicates a respective communication path in the communication network via which the respective time synchronization packet is to be transmitted, and cause the plurality of time synchronization packets to be transmitted (i) via at least one of the one or more first ports, and (ii) via multiple different communication paths in the communication network. The system also comprises a second network device communicatively coupled to the first network device via the communication network. The second network device includes one or more second ports coupled to the communication network, the one or more second ports configured to receive the plurality of time synchronization packets from the first network device. The second network device also includes a path determination module implemented on one or more integrated circuit devices configured to identify, based on respective path information included in each of at least some of the plurality of time synchronization packets, particular communication paths among the multiple communication paths, via which the respective time synchronization packets traveled from the first network clock device to the second network device. The second network device also includes a clock module implemented on the one or more integrated circuit devices configured to determine a value of the system time clock based on (i) respective time information included in the at least some of the plurality of time synchronization packets and (ii) the identifications of the particular communication paths via which the respective time synchronization packets traveled from the first network clock device to the second network device.

BRIEF DESCRIPTION OF THE DRAWINGS

FIG. 3 is a timing diagram illustrating signals exchanged via multiple paths between a slave clock and a master clock, according to an embodiment.

DETAILED DESCRIPTION

Figure 1A:
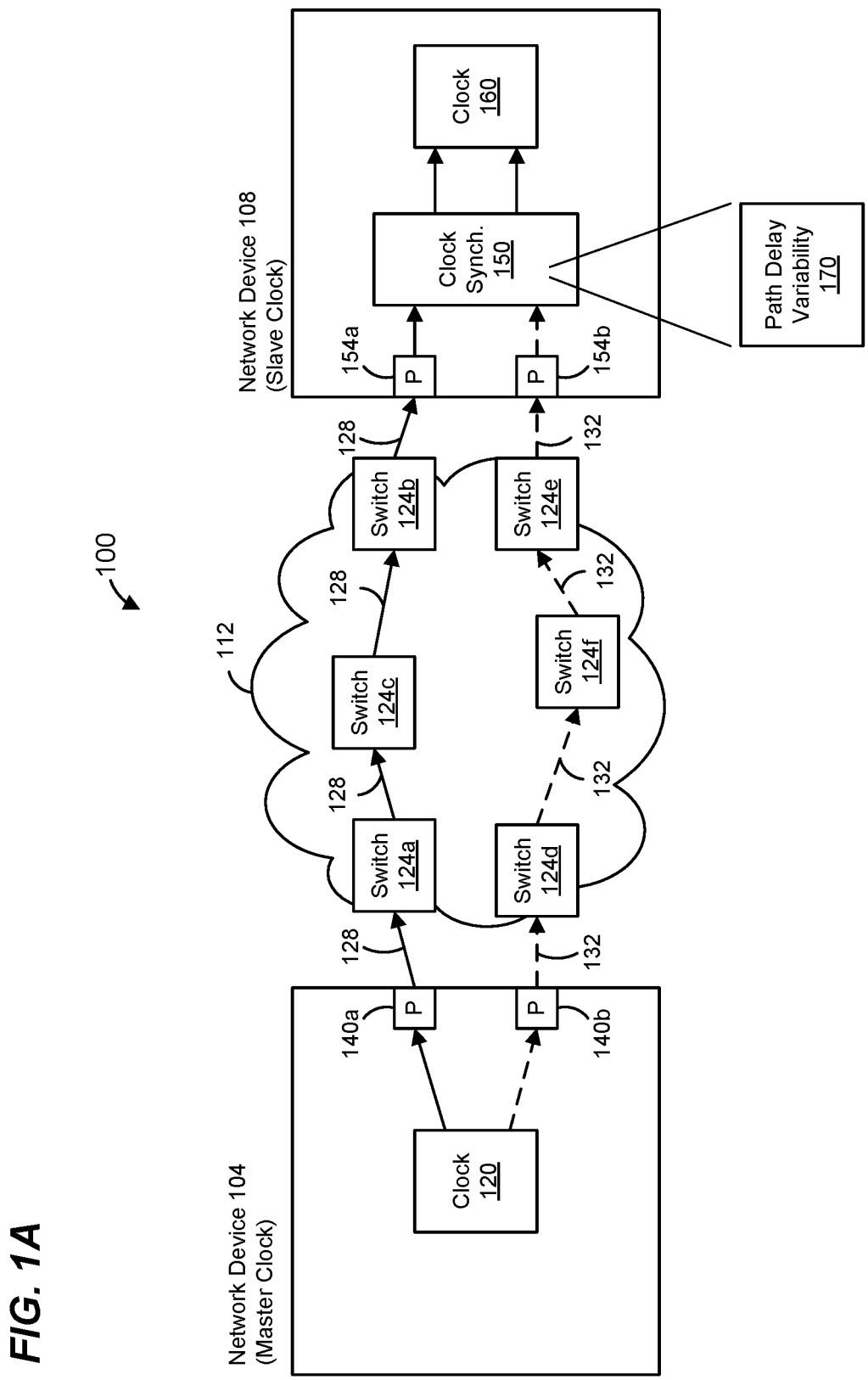
FIG. 1A is a block diagram of an example system in which a slave clock is maintained based on a master clock and based on signals transmitted by the master clock via multiple paths in a network, according to an embodiment.

FIG. 1A is a block diagram of an example system 100, according to an embodiment, having a first network device 104 communicatively coupled to a second network device 108 via a communication network 112. The first network device 104 implements a master clock, and the first network device 104 is sometimes referred to herein as the master clock device 104. The second network device 108 implements a slave clock, and the second network device 108 is sometimes referred to herein as the slave clock device 108.

The master clock device 104 includes a clock module 120 configured to maintain the master clock. In an embodiment, the master clock is a time-of-day clock. In another embodiment, the master clock is a counter not directly linked to a time-of-day. In an embodiment, the clock module 120 includes or utilizes a counter circuit that maintains the master clock. In an embodiment, the clock module 120 is an application layer module operating at an application layer in a multi-layer communication protocol stack. In an embodiment, the multi-layer communication protocol stack (e.g., the Transport Control Protocol/Internet Protocol (TCP/IP) protocol suite) comprises a link layer, an Internet layer, a transport layer, and the application layer, where the application layer is above the transport layer, the Internet layer, and the link layer in the protocol stack. In another embodiment, the multi-layer communication protocol stack (e.g., corresponding to the Open Systems Interconnection (OSI) model) comprises a physical layer, a data link layer, a network layer, a transport layer, a session layer, a presentation layer, and the application layer, where the application layer is above the presentation layer, the session layer, the transport layer, the network layer, the data link layer, and the physical layer in the protocol stack. In other embodiments, the clock module 120 operates at another suitable layer at least at a fourth layer in a multi-layer communication protocol stack.

The clock module 120 is configured to cause a plurality of time-stamped packets to be transmitted from the master clock device 104 to the slave clock device 108 via respective different communication paths through the network 112. The plurality of time-stamped packets are time-stamped with one or more values of the master clock maintained by the clock module 120, in an embodiment.

The network 112 comprises one or more of a private network, a public network, a backbone network, a provider network, the Internet, etc. The network 112 comprises a plurality of network switches and/or routers 124 (referred to hereinafter as switches merely for brevity), in an embodiment, and a first path 128 corresponds to a link from the switch 124*a* to the switch 124*b* via the switch 124*c*. A second path 132 corresponds to a link from the switch 124*d* to the switch 124*e* via the switch 124*f*.

The clock module 120 is configured to cause a first time-stamped packet to be transmitted from the master clock device 104 to the slave clock device 108 via the path 128, and to cause a second time-stamped packet to be transmitted from the master clock device 104 to the slave clock device 108 via the path 132. In an embodiment, the master clock device 104 includes multiple ports 140, and the clock module 120 is configured to cause the first time-stamped packet to be transmitted via the port 140*a* and the second time-stamped packet to be transmitted via the port 140*b*. In other embodiments and/or scenarios, each of at least some of the time-stamped packets are transmitted via the same port 140 (not shown in FIG. 1A). Although two ports 140 are illustrated in FIG. 1A, in other embodiments, the master clock device 104 includes another suitable number of ports 140 (e.g., only one port or more than two ports).

In one embodiment, the master clock device 104 includes only a single port 140, and path diversity is entirely provided by the network 112. For example, in locally administered networks 112, switches/routers can be configured to utilize different paths when transmitting packets destined for the same endpoint device but including different header information (e.g., source addresses, destination addresses, Layer 4 ports, etc.), in some embodiments. As another example, public and/or provider networks, at least some switches/routers in the network 112 apply load balancing techniques in which packets destined for the same endpoint device are directed along different paths based upon different header information in the packets (e.g., source addresses, destination addresses, Layer 4 ports, etc.), in some embodiments. Thus, to cause the network 112 to transmit packets to the slave clock device 108 via different paths, the master clock device 104 varies header information in the packets (e.g., source addresses, destination addresses, Layer 4 ports, etc.), in some embodiments.

Unlike the depiction in FIG. 1A, which shows different ports 140 coupled to different ones of the switches 124, in some embodiments, two or more of the ports 140 are coupled to a single switch 124. In such embodiments, at least some of the different network paths pass through different ports of the single switch 124 coupled to the two or more ports 140 of the master clock device 104. For example, in locally administered networks 112, switches/routers can be configured to utilize different paths when transmitting packets destined for the same endpoint device but including different header information (e.g., source addresses, destination addresses, Layer 4 ports, etc.) and/or when the packets are received via different physical ports of the switch/router, in some embodiments. As another example, public and/or provider networks, at least some switches/routers in the network 112 apply load balancing techniques in which packets destined for the same endpoint device are directed along different paths based upon different header information in the packets (e.g., source addresses, destination addresses, Layer 4 ports, etc.) and/or based on the physical ports of the switch/router via which the packets are received, in some embodiments. Thus, to cause the network 112 to transmit packets to the slave clock device 108 via different paths, the master clock device 104 varies header information in the packets (e.g., source addresses, destination addresses, Layer 4 ports, etc.) and/or transmits packets via different physical ports of the master clock device 104, where the different physical ports of the master clock device 104 are respectively coupled to different physical ports of the switch 124, in some embodiments.

A clock synchronization module 150 of the slave clock device 108 is configured to determine different clock results corresponding to the plurality of time-stamped packets transmitted by the master clock device 104, and corresponding to the plurality of different communication paths through the network 112. For example, the clock synchronization module 150 is configured to determine a first clock result corresponding to the first time-stamped packet transmitted via the first path 128, and a second clock result corresponding to the second time-stamped packet transmitted via the second path 132. In an embodiment, the slave clock device 108 includes multiple ports 154, and the first time-stamped packet is received via the port 154*a* and the second time-stamped packet is received via the port 154*b*. In other embodiments and/or scenarios, each of at least some of the time-stamped packets are received via the same port 154 (not shown in FIG. 1A). Although two ports 154 are illustrated in FIG. 1A, in other embodiments, the slave clock device 108 includes another suitable number of ports 154 (e.g., only one or more than two). In an embodiment, the slave clock device 108 includes only a single port 154.

The clock synchronization module 150 is configured to determine each clock result based on a respective time stamp in the respective time-stamped packet transmitted via the respective path. In an embodiment, each clock result generated by the clock synchronization module comprises an offset between the master clock maintained at the master clock device 104 and a slave clock maintained at the slave clock device 108. For example, the clock synchronization module 150 is configured to determine each offset based on (i) the respective time stamp in the respective time-stamped packet transmitted via the respective path, and (ii) a value of the slave clock at a respective time at which the respective time-stamped packet was received by the slave clock device 108, in an embodiment. As an illustrative example, in an embodiment, the clock synchronization module 150 determines a first offset based on (i) a first time stamp in the first time-stamped packet transmitted via the first path 128, and (ii) a first value of the slave clock at a first time at which the first time-stamped packet was received by the slave clock device 108; and the clock synchronization module 150 determines a second offset based on (i) a second time stamp in the second time-stamped packet transmitted via the second path 132, and (ii) a second value of the slave clock at a second time at which the second time-stamped packet was received by the slave clock device 108.

In another embodiment, each clock result generated by the clock synchronization module 150 comprises a clock value (e.g., a time-of-day value) corresponding to the master clock maintained at the master clock device 104. For example, the clock synchronization module 150 is configured to determine each clock value based on the respective time stamp in the respective time-stamped packet transmitted via the respective path, in an embodiment. As an illustrative example, in an embodiment, the clock synchronization module 150 determines a first clock value based on the first time stamp in the first time-stamped packet transmitted via the first path 128, and determines a second clock value based on the second time stamp in the second time-stamped packet transmitted via the second path 132. In an embodiment, the clock synchronization module 150 is an application layer module operating at the application layer in the multi-layer communication protocol stack. In other embodiments, the clock synchronization module 150 operates at another suitable layer at least at a fourth layer in a multi-layer communication protocol stack. In other embodiments, the clock synchronization module 150 is at another suitable layer below an application layer and/or operates at a suitable layer below the fourth layer in the multi-layer communication protocol stack.

As will be described in more detail below, the clock synchronization module 150 is configured to maintain, for each path, a respective path time data set that includes a respective path-dependent clock, or information for generating the respective clock result such as a respective path delay measurement, a respective clock offset, etc., in some embodiments. In some embodiments, the clock synchronization module 150 uses the path time data sets to generate the clock results. In other embodiments, the clock results are the path time data sets or are included in the path time data sets. In some embodiments in which the clock synchronization module 150 is configured to maintain respective path-dependent clocks, the clock synchronization module 150 includes or utilizes respective counter circuits that maintain the different path-dependent clocks.

A clock module 160 in the slave clock device 108 is configured to maintain the slave clock, in some embodiments. In an embodiment, the slave clock is a time-of-day clock. In another embodiment, the slave clock is a counter not directly linked to a time-of-day. In an embodiment, the clock module 160 includes or utilizes a counter circuit that maintains the slave clock. In an embodiment, the clock module 160 is an application layer module operating at the application layer in the multi-layer communication protocol stack. In other embodiments, the clock module 160 operates at another suitable layer at least at a fourth layer in a multi-layer communication protocol stack. In some embodiments in which the clock synchronization module 150 is configured to maintain respective path-dependent clocks, the clock module 160 is configured to select one of the path-dependent clocks as the slave clock rather than maintaining a separate slave clock.

The clock module 160 is configured to determine the slave clock value using the plurality of clock results generated by the clock synchronization module 150, in some embodiments. In an embodiment, the clock module 160 is configured to determine the slave clock value at least by mathematically combining the plurality of clock results generated by the clock synchronization module 150. In another embodiment, the clock module 160 is configured to determine the slave clock value at least by selecting one of the plurality of clock results generated by the clock synchronization module 150. For example, one of the clock results is determined to be most accurate based on independently determined accuracy metrics for each path such as path length, path delay variability (or noisiness) etc., in some embodiments. In another embodiment, the clock module 160 is configured to determine the slave clock value at least by (i) combining at least some of the plurality of clock results generated by the clock synchronization module 150 in some situations, and (ii) selecting one of the plurality of clock results generated by the clock synchronization module 150 in other situations. In another embodiment, the clock module 160 is configured to determine the slave clock value at least by (i) selecting a subset of the plurality of clock results generated by the clock synchronization module 150, and (ii) combining the subset of clock results. For example, the selected subset is the clock result(s) that are determined to be suitably accurate based on independently determined accuracy metrics for each path such as path length, path delay variability (or noisiness) etc., in some embodiments.

In some embodiments in which the clock results generated by the clock synchronization module 150 comprise offsets, the clock module 160 is configured to determine the slave clock value at least by mathematically combining two or more of the plurality of offsets to generate a combined offset, and then use the combined offset to set the slave clock value. In some embodiments in which the clock results generated by the clock synchronization module 150 comprise offsets, the clock module 160 is configured to select one of the plurality of offsets, and then use the selected offset to set the slave clock value. For example, one of the offsets is determined to be most accurate based on independently determined accuracy metrics for each path such as path length, path delay variability (or noisiness) etc., in some embodiments. In some embodiments in which the clock results generated by the clock synchronization module 150 comprise offsets, the clock module 160 is configured to, (i) in some situations, mathematically combine the plurality of offsets to generate the combined offset, and then use the combined offset to set the slave clock value, and (ii) in other situations, select one of the plurality of offsets, and then use the selected offset to set the slave clock value. In an embodiment, the clock module 160 is configured to determine the slave clock value at least by (i) selecting a subset of the plurality offsets, and (ii) combining the subset of offsets. For example, the selected subset is the offset(s) that are determined to be suitably accurate based on independently determined accuracy metrics for each path such as path length, path delay variability (or noisiness) etc., in some embodiments.

In some embodiments in which the clock results generated by the clock synchronization module 150 comprise different clock values corresponding to different paths (path clock values), the clock module 160 is configured to determine the slave clock value at least by mathematically combining two or more of the different path clock values to generate a combined clock value, and then use the combined clock value to set the slave clock value. In some embodiments in which the clock results generated by the clock synchronization module 150 comprise path clock values, the clock module 160 is configured to select one of the path clock values, and then use the selected path clock value to set the slave clock value. For example, one of the clock values is determined to be most accurate based on independently determined accuracy metrics for each path such as path length, path delay variability (or noisiness) etc., in some embodiments. In some embodiments in which the clock results generated by the clock synchronization module 150 comprise path clock values, the clock module 160 is configured to, (i) in some situations, mathematically combine at least some of the path clock values to generate the combined clock value, and then use the combined clock value to set the slave clock value, and (ii) in other situations, select one of the path clock values, and then use the selected path clock value to set the slave clock value.

In an embodiment, the clock module 160 is configured to calculate an average of at least some of the clock results generated by the clock synchronization module 150, and to determine the slave clock value based on the average clock result. In some embodiments in which the clock results generated by the clock synchronization module 150 comprise offsets, the clock module 160 is configured to calculate an average of at least some of the offsets, and to determine the slave clock value based on the average offset. In some embodiments in which the clock results generated by the clock synchronization module 150 comprise different clock values corresponding to different paths (path clock values), the clock module 160 is configured to calculate an average of at least some of the path clock values, and to determine the slave clock value based on the average clock value. In an embodiment, the clock module 160 is configured to determine the slave clock value at least by (i) selecting a subset of the plurality path clock values, and (ii) combining the subset of path clock values. For example, the selected subset is the path clock value(s) that are determined to be suitably accurate based on independently determined accuracy metrics for each path such as path length, path delay variability (or noisiness) etc., in some embodiments.

In some embodiments, the clock module 160 is configured to calculate a weighted average of at least some of the clock results. In an embodiment, weights utilized in calculating the weighted average are determined based on independently determined accuracy metrics for each path such as path length, path delay variability (or noisiness) etc. For example, relatively lesser weight is given to a path with a relatively longer length, whereas relatively greater weight is given to a path with a relatively shorter length, in an embodiment. As another example, relatively lesser weight is given to a path with a relatively higher variability (or noisiness) in path delay, whereas relatively greater weight is given to a path with a relatively lower variability (or noisiness) in path delay, in an embodiment.

For example, in an embodiment, the clock synchronization module 150 includes a path delay variability determination module 170 configured to generate respective measures of path delay variability for the different paths through the network 112. In an embodiment, the clock synchronization module 150 is configured to utilize the measures of path delay variability for the different paths through the network 112 to determine the different weights utilized in calculating the weighted average. For example, relatively lesser weight is given to a path with a relatively higher variability (or noisiness) in path delay, whereas relatively greater weight is given to a path with a relatively lower variability (or noisiness) in path delay, in an embodiment.

In an embodiment, the path delay variability determination module 170 is configured to generate respective path delay measures for the different paths through the network 112. In an embodiment, each path delay measure is a measure of a one-way delay from the master clock device 104 to the slave clock device 108 via the respective path. In an embodiment, the path delay variability determination module 170 is configured to generate, for each path, the one-way delay by (i) determining a round-trip delay from the slave clock device 108 to the master clock device 104 and back to the slave clock device 108 via the respective path, and (ii) calculating the one-way delay based on the round trip delay. In an embodiment, the one-way delay is calculated as one half of the round-trip delay.

In an embodiment, the path delay variability determination module 170 is configured to generate respective average path delays for the different paths through the network 112. In an embodiment, the path delay variability determination module 170 is configured to generate, for each path, the respective measure of path delay variability based on the respective average path delay and a respective recent (e.g., most recent) path delay measure. In an embodiment, the path delay variability determination module 170 is configured to generate, for each path, the respective measure of path delay variability based on calculating a difference between the respective average path delay and the respective recent (e.g., most recent) path delay measure. The magnitude of the difference calculated for a path generally indicates a degree of variability in the path delay for the path, in an embodiment. For example, if a magnitude of a first difference calculated for a first path is greater than a magnitude of a second difference calculated for a second path, it is assumed that the path delay in the first path has a greater degree of variability than the path delay in the second path, in an embodiment.

In some embodiments in which the clock results generated by the clock synchronization module 150 comprise offsets, the clock module 160 is configured to select one of the offsets based on measures of path delay variability for the different paths, and then use the selected offset to set the slave clock value. For example, in an embodiment, the clock module 160 is configured to select an offset corresponding to a path with a lowest measure of path delay variability, and then use the selected offset to set the slave clock value.

In some embodiments in which the clock results generated by the clock synchronization module 150 comprise offsets, the clock module 160 is configured to select a set of the offsets that are each associated with a measure of path delay variability that meets one or more criteria, and to determine an offset using the set of selected offsets. For example, in an embodiment, the clock module 160 is configured to select a set of the offsets that are each associated with a measure of path delay variability that meets a threshold (e.g., is less than the threshold, is less than or equal to the threshold, etc.), and to determine an offset using the set of selected offsets. For example, in an embodiment, if there are multiple offsets in the set, the clock module 160 is configured to calculate an average of the selected offsets, and to determine the slave clock value using the average offset. In an embodiment, paths with high variability are not considered when calculating the average such that only paths with a measured variability less than a suitable variability threshold are used when calculating the average. In an embodiment, if there is only one path with a measured variability less than the suitable variability threshold, the corresponding one offset is used to set the slave clock value (i.e., an average of multiple offsets is not calculated). In other words, in an embodiment, if there is only one offset in the set, the clock module 160 is configured to set the slave clock using the selected offset.

In some embodiments in which the clock results generated by the clock synchronization module 150 comprise different clock values corresponding to different paths (path clock values), the clock module 160 is configured to select one of the path clock values based on measures of path delay variability for the different paths, and then use the selected path clock value to set the slave clock value. For example, in an embodiment, the clock module 160 is configured to select a path clock value corresponding to a path with a lowest measure of path delay variability, and then use the selected path clock value to set the slave clock value.

In some embodiments in which the clock results generated by the clock synchronization module 150 comprise different clock values corresponding to different paths (path clock values), the clock module 160 is configured to select a set of the path clock values that are each associated with a measure of path delay variability that meets one or more criteria, and to determine an average path clock value using the set of selected path clock values. For example, in an embodiment, the clock module 160 is configured to select a set of the path clock values that are each associated with a measure of path delay variability that meets a threshold (e.g., is less than the threshold, is less than or equal to the threshold, etc.), and to determine slave clock value using the set of selected path clock values. For example, in an embodiment, if there are multiple path clock values in the set, the clock module 160 is configured to calculate an average of the selected path clock values, and to determine the slave clock value using the average path clock value. As another example, in an embodiment, if there is only one path clock value in the set, the clock module 160 is configured to set the slave clock using the selected path clock value.

In some embodiments, the clock synchronization module 150 is configured to measure respective path characteristics for each path such as path length, path delay variability (or noisiness), etc., and/or measured characteristics of respective path clock values, such as degree of jitter. In an embodiment, the path length is measured in terms of a number of hops. For example, in some embodiments, Traceroute-based path discovery techniques are utilized to determine the number of hops in a path. In some embodiments, the clock synchronization module 150 is configured to measure respective path characteristics for each path such as path length, path delay variability (or noisiness), etc., and/or measured characteristics of respective path clock values, such as degree of jitter.

Figure 1B:
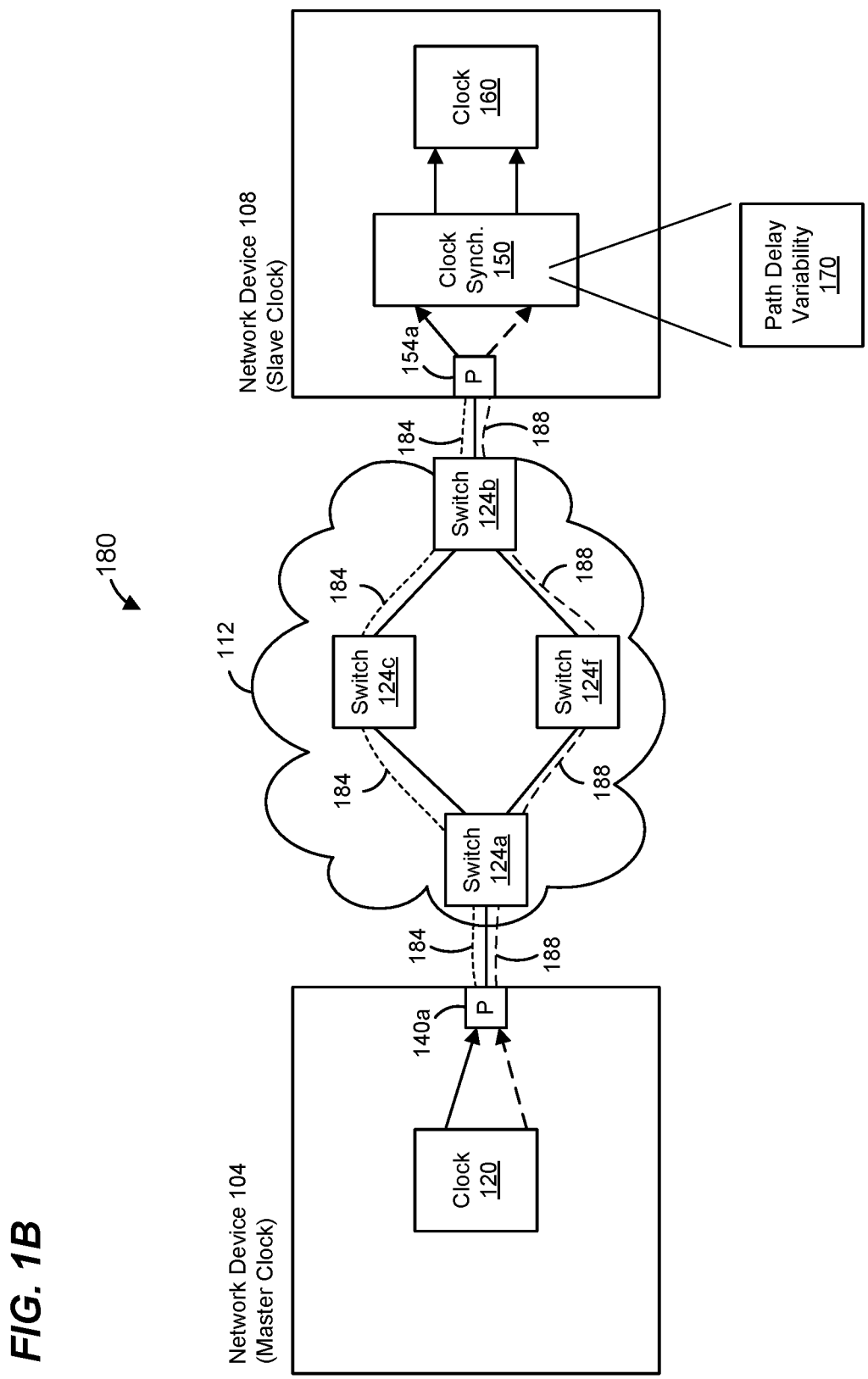
FIG. 1B is a block diagram of another example system in which a slave clock is maintained based on a master clock and based on signals transmitted by the master clock via multiple paths in a network, according to an embodiment.

FIG. 1B is a block diagram of another example system 180 which the master clock device 104 includes only a single port 140a and the slave clock device 108 includes only a single port 154a. Path diversity is entirely provided by the network 112. As discussed above, for example, switches 124 are configured to utilize different paths 184, 188 when transmitting packets destined for the same endpoint device but including different header information (e.g., source addresses, destination addresses, Layer 4 ports, etc.), in some embodiments. As another example, switches 124 apply load balancing techniques in which packets destined for the same endpoint device are directed along different paths 184, 188 based upon different header information in the packets (e.g., source addresses, destination addresses, Layer 4 ports, etc.), in some embodiments. Thus, to cause the network 112 to transmit packets to the slave clock device 108 via different paths 184, 188, the master clock device 104 varies header information in the packets (e.g., source addresses, destination addresses, Layer 4 ports, etc.), in some embodiments.

Figure 2A:
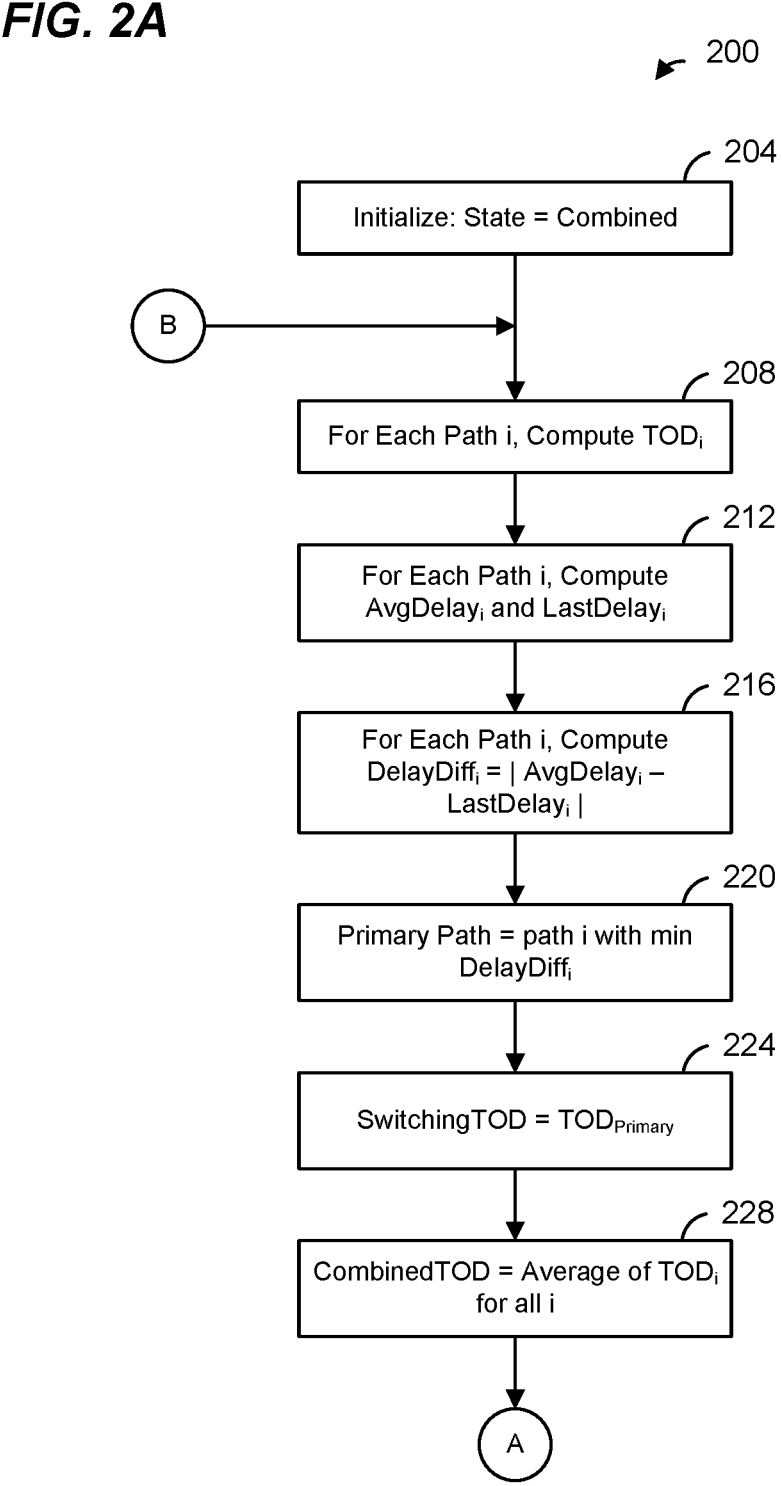
FIGS. 2A and 2B are a flow diagram of an example method for maintaining a slave clock using multiple clock signals received from a master clock via multiple paths in a network, according to an embodiment.
Figure 2B:
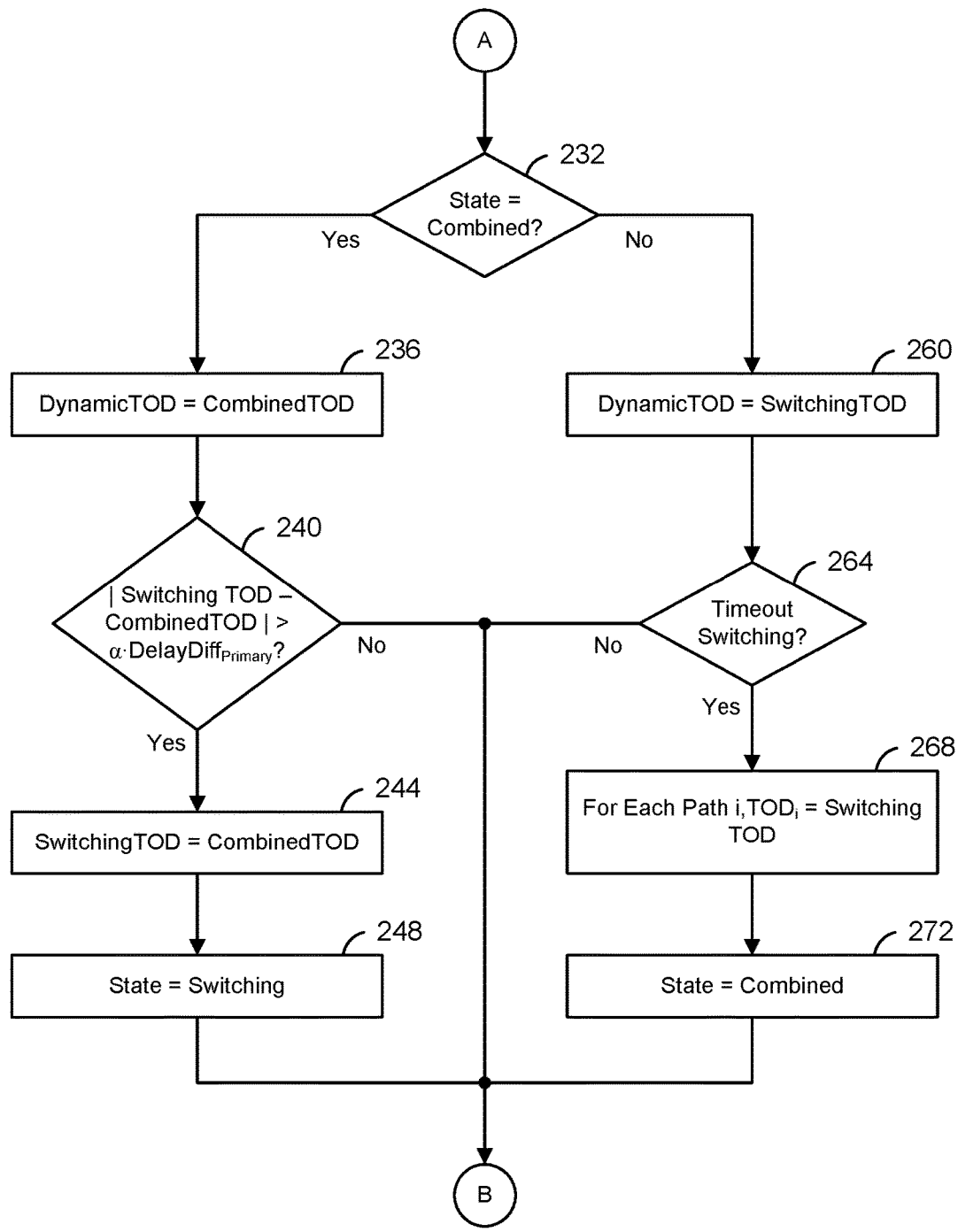

FIGS. 2A and 2B are a flow diagram of an example method 200 for maintaining a slave clock using multiple clock signals received from a master clock via multiple paths in a network, according to an embodiment. The slave clock device 108 of FIG. 1A or FIG. 1B is configured to implement the method 200, in an embodiment, and the method 200 is discussed with reference to FIGS. 1A and 1B for explanatory purposes. In other embodiments, however, the method 200 is implemented by another suitable device.

At block 204, a state variable is initialized to a value COMBINED. The state variable generally indicates how the slave clock is to be set. For example, when the state variable is a value COMBINED, the slave clock is to be set according to a first technique (as described below), and when the state variable is a value SWITCHING, the slave clock is to be set according to a second technique (as described below), in an embodiment.

At block 208, a respective clock (e.g., a respective time of day clock ($TOD_i$)) is determined for each of a plurality of paths via which clock signals are received from the master clock device 104. For example, a $TOD_1$ is determined for clock signals from the master clock device 104 received via path 128, and $TOD_2$ is determined for clock signals from the master clock device 104 received via path 132. Block 208 comprises determining a respective $TOD_i$ each time a clock signal from the master clock is received via the respective path i, in an embodiment.

At block 212, a most recent measure of a delay from the master clock device 104 to the slave clock device 108 via the path i ($LastDelay_i$) is determined for each path i. For example, in order to measure the LastDelay for the i-th path, the slave clock device 108 transmits a path delay measurement packet (e.g., an Internet Control Message Protocol (ICMP) echo request packet) to the master clock device 104, which prompts the master clock device 104 to immediately transmit a response packet (e.g., an ICMP response) to the slave clock device 108 via the path i, in an embodiment. The slave clock device 108 then measures the round-trip delay corresponding to the path i based on when the ICMP echo request packet was transmitted and when the ICMP response was received via the path i, and determines the $LastDelay_i$ as one half the round-trip delay, in an embodiment. Such measurements are made periodically, according to a schedule, etc., in various embodiments.

Also at block 212, an average delay from the master clock device 104 to the slave clock device 108 via the path i ($AvgDelay_i$) is determined for each path i. For example, the $AvgDelay_i$ is calculated by averaging multiple $LastDelay_i$ values over time, in an embodiment. As each $LastDelay_i$ for the i-th path is calculated, the $AvgDelay_i$ is updated with the new $LastDelay_i$ value, in an embodiment.

At block 216, respective measures of path delay variability for the different paths are calculated. For example, an absolute value of the difference ($DelayDiff_i$) between the $AvgDelay_i$ and the $LastDelay_i$ is calculated for each path i, in an embodiment. For example, a larger $DelayDiff_i$ indicates relatively more variability as compared to a smaller $DelayDiff_i$, in an embodiment. As each $LastDelay_i$ for the i-th path is calculated, the $AvgDelay_i$ is updated, as discussed above, and then a new $DelayDiff_i$ is calculated, in an embodiment.

In some embodiments, the respective measures of path delay variability for the different paths also provide a measure of noisiness of the respective $TOD_i$'s. For example, as the path delay variability for the i-th path increases, jitter (or noisiness) of the TOD for the i-th path will also increase, in an embodiment. In other embodiments, respective measures of noisiness of the respective $TOD_i$'s are determined by analyzing the respective $TOD_i$'s over time.

At block 220, a primary path is selected as the path with the lowest measure of path delay variability. For example, the primary path is selected as the paths with the lowest $DelayDiff_i$. In other embodiments, the primary path is selected based on one or more suitable measured characteristics of the individual TODs, such as degree of jitter.

At block 224, a first TOD (SwitchingTOD) is set to the $TOD_i$ (determined at block 208) corresponding to the primary path (determined at block 220). As will be explained below, the SwitchingTOD is used when the state variable is set to SWITCHING. The SwitchingTOD corresponds to the $TOD_i$ of the path with the lowest measure of path delay variability, in an embodiment. In other embodiments, the SwitchingTOD corresponds to the $TOD_i$ of a path selected based on measured characteristics of the individual TODs, such as degree of jitter.

At block 228, a second TOD (CombinedTOD) is set to an average of the $TOD_i$'s for all of the paths (determined at block 208). As will be explained below, the CombinedTOD is used when the state variable is set to COMBINED. In an embodiment, block 228 comprises calculating a weighted average. In an embodiment, weights for calculating the weighted average are determined based on the $DelayDiff_i$ values calculated at block 216. Thus, in some embodiments, the weights for calculating the weighted average are configurable and are determined based on measured path characteristics such as path length, path delay variability (or noisiness), etc., and/or measured characteristics of the individual TODs, such as degree of jitter.

At block 232, it is determined whether the state variable is set to COMBINED. If it is determined that the state variable is set to COMBINED, the flow proceeds to block 236. At block 236, the slave clock (DynamicTOD) is set to the CombinedTOD determined at block 228.

At block 240, the absolute value of a difference between the SwitchingTOD and the CombinedTOD is compared to a threshold. In an embodiment, the threshold is the DelayDiff of the primary path multiplied by a suitable scalar a. If it is determined that the absolute value of the difference between the SwitchingTOD and the CombinedTOD does not meet the threshold (e.g., is less than or equal to the threshold), the state variable remains set to COMBINED, and the flow returns to block 208.

On the other hand, if it is determined at block 240 that the absolute value of the difference between the SwitchingTOD and the CombinedTOD meets the threshold (e.g., is greater than the threshold), this may indicate that the path delay variability in one or more of the paths has increased, and the flow proceeds to block 244. At block 244, the SwitchingTOD is set to the CombinedTOD. In an embodiment, block 244 helps ensure continuity of the DynamicTOD. At block 248, the state variable is set to SWITCHING. In an embodiment, the state variable is set to SWITCHING because the comparison at block 240 indicates that path delay variability in one or more of the paths has increased, which may adversely impact the CombinedTOD. After block 248, the flow returns to block 208.

Referring again to block 232, if it is determined that the state variable has the value SWITCHING, in an embodiment, the flow proceeds to block 260. At block 260, the slave clock (DynamicTOD) is set to the SwitchingTOD determined at block 224.

At block 264, it is determined whether the state variable has been set to the value SWITCHING at least for a timeout period. If it is determined that the state variable has been set to the value SWITCHING for less than the timeout period, in an embodiment, the state variable remains set to SWITCHING, and the flow returns to block 208.

On the other hand, if it is determined that the state variable has been set to the value SWITCHING for at least the timeout period, in an embodiment, the flow proceeds to block 268. At block 268, the $TOD_i$ for each path i is set to the SwitchingTOD. In an embodiment, block 268 helps ensure continuity of the DynamicTOD. At block 272, the state variable is set to COMBINED. After block 272, the flow returns to block 208.

In some embodiments, the $TOD_i$ for each path i, the SwitchingTOD, and the CombinedTOD are calculated offsets between the master clock and the slave clock. In an embodiment, the slave clock (DynamicTOD) is updated using either the CombinedTOD offset (block 236) or the SwitchingTOD offset (block 260). For example, the slave clock is updated by adding the offset to a current value of the slave clock, in an embodiment.

FIG. 3 is a timing diagram 300 illustrating signals exchanged between the slave clock device 108 and the master clock device 104 as part of an example of maintaining the slave clock, according to an embodiment. The scenario illustrated in FIG. 3 involves two different paths in the network 112: path 0 and path 1. In other scenarios, a suitable number of paths greater than two are utilized, at least in some embodiments.

At time $T_0$, the slave clock device 108 transmits a first path delay measurement packet (e.g., ICMP echo request packet) to the master clock device 104, prompting the master clock device 104 to immediately transmit a first response packet (e.g., an ICMP response) to the slave clock device 108 via the path 0, in an embodiment. At time $T_1$, the first response packet (e.g., an ICMP response) transmitted by the master clock device 104 via the path 0 is received at the slave clock device 108, in an embodiment.

After time $T_1$, the slave clock device 108 calculates a delay on path 0 ($\Delta_0$) as one half of the round trip delay:

$$\Delta_0 = (T_1 - T_0)/2. \quad \text{(Equation 1)}$$

At time $T_2$, the slave clock device 108 transmits a second path delay measurement packet (e.g., ICMP echo request packet) to the master clock device 104, prompting the master clock device 104 to immediately transmit a second response packet (e.g., an ICMP response) to the slave clock device 108 via the path 1, in an embodiment. At time $T_3$, the second response packet (e.g., an ICMP response) transmitted by the master clock device 104 via the path 1 is received at the slave clock device 108, in an embodiment.

After time $T_3$, the slave clock device 108 calculates a delay on path 1 ($\Delta_1$) as one half of the round trip delay:

$$\Delta_1 = (T_3 - T_2)/2. \quad \text{(Equation 2)}$$

At time $T_4$, the master clock device 104 transmits a first time-stamped packet to the slave clock device 108 via the path 0. In an embodiment, the first time-stamped packet includes a time stamp equal to (or substantially equal to) a value corresponding to time $T_4$. At time $T_5$, the slave clock device 108 receives the first time-stamped packet via the path 0. After time $T_5$, the slave clock device 108 computes a clock offset corresponding to path 0 based on the first time-stamped packet and the calculated delay on path 0 ($\Delta_0$). In an embodiment, the clock offset corresponding to path 0 ($Offset_0$) is calculated according to:

$$Offset_0 = T_4 - T_5 + \Delta_0. \quad \text{(Equation 3)}$$

At time $T_6$, the master clock device 104 transmits a second time-stamped packet to the slave clock device 108 via the path 1. In an embodiment, the second time-stamped packet includes a time stamp equal to (or substantially equal to) a value corresponding to time $T_6$. At time $T_7$, the slave clock device 108 receives the second time-stamped packet via the path 1. After time $T_7$, the slave clock device 108 computes a clock offset corresponding to path 1 based on the second time-stamped packet and the calculated delay on path 1 ($\Delta_1$). In an embodiment, the clock offset corresponding to path 1 ($Offset_1$) is calculated according to:

$$Offset_1 = T_6 - T_7 + \Delta_1. \quad \text{(Equation 4)}$$

The slave clock is then updated using the clock offset corresponding to path 0 and the clock offset corresponding to path 1. For example, the slave clock is then updated using the clock offset corresponding to path 0 and the clock offset corresponding to path 1 according to techniques such as described above (e.g., computing an average of the path 0 offset and the path 1 offset, selecting one of the path 0 offset and the path 1 offset based on path delay variability, etc.).

As discussed above, various packets are transmitted between the master clock device 104 and the slave clock device 108 via different paths through the network 112. The master clock device 104 and slave clock device 108 each should be able to determine the path via which packets are to travel after transmission, and to identify the path via which packets are received. Various techniques for configuring, identifying, specifying, utilizing, etc., different paths through the network 112 will now be described.

At least some of the techniques for specifying and/or utilizing different paths involve assigning different addresses (e.g., IP addresses) to the master clock and/or assigning different addresses (e.g., IP addresses) to the slave clock, wherein different addresses and/or different pairs of addresses correspond to different paths through the network 112.

In locally administered networks 112, switches/routers can be configured to utilize different paths when transmitting packets destined for the same endpoint device but including different address information (e.g., source addresses and/or destination addresses), in an embodiment. For example, the routing/forwarding tables across the network can be configured with multiple traffic engineered paths between the master clock and the slave clock. By configuring the routers/switches in such networks diverse paths are created for transmission of packets between the master clock and the slave clock.

On the other hand, in other types of networks, such as public and provider networks, it not possible or practical to configure switches/routers to provide different paths. In some networks 112, at least some switches/routers in the network 112 apply load balancing techniques in which packets destined for the same endpoint device are directed along different paths, in some embodiments. To utilize load balancing capabilities of such switches/routers when transmitting a packet to the slave clock device 108, the master clock device 104, for example, uses different addresses (e.g., destination address) and/or pairs of addresses (e.g., {master, slave}) in the packet.

In some embodiments and/or scenarios, although a plurality of addresses and/or address pairs as a whole correspond to a plurality of different paths, two or more of such addresses or address pairs may correspond to exactly the same network path, making them such addresses/address pairs redundant. Thus, in some embodiments, the master clock device 104 and/or the slave clock device 108 are configured to utilize Traceroute-based path discovery to determine addresses/address pairs that correspond to redundant paths, and then omit and/or filter addresses/address pairs to avoid using redundant paths. "Paris traceroute" (available at www.paris-traceroute.net) and "TraceFlow" (Viswanathan et al., "TraceFlow draft-zinjuvadia-traceflow-02.txt," Internet Draft, Internet Engineering Task Force (IETF), August 2008, available at tools.ietf.org/html/draft-zinjuvadia-traceflow-02) are examples of tools that discover the paths between two points in the network. Traceroute-based filtering is implemented by both the master clock device 104 and the slave clock device 108, in an embodiment. Traceroute-based filtering is implemented only on the slave clock device 108 to reduce overhead on the master clock device 104, in another embodiment. Other suitable tools for discovering the paths between two points in a network are utilized in other embodiments.

In an embodiment, the slave clock utilizes multiple IP addresses. In an embodiment, each of at least some of the multiple IP addresses of the slave clock corresponds to a different path. In an embodiment, the master clock utilizes multiple IP addresses. In an embodiment, at least some different {master IP, slave IP} address pairs corresponds to different paths. In other embodiments, the master clock utilizes multiple VLAN IDs, where each VLAN ID corresponds to a different path.

In some embodiments, other suitable fields in the packet header are utilized alternatively or additionally to determine different paths. Examples of other header fields utilized to determine a path include one or more of a user datagram protocol (UDP) port field, a Transmission Control Protocol (TCP) port field, the Flow Label field in an IPv6 header, a VLAN ID field in an Ethernet header, a Label field in a Multiprotocol Label Switching (MPLS) header, etc. In various embodiments, any combination of any subset of master IP address, slave IP address, a UDP port field, a TCP port field, the Flow Label field in an IPv6 header, a VLAN ID field in an Ethernet header, a Label field in an MPLS header, are utilized to determine and/or identify a path via which a packet is to be or was transmitted.

In some embodiments, the slave clock device 108 utilizes other suitable information to determine via which path a packet was transmitted. For example, in an embodiment, the slave clock device 108 is configured to note the physical port 154 via which a packet is received, and to determine via which path the packet was transmitted based on at least the physical port 154 via which the packet was received.

Figure 4:
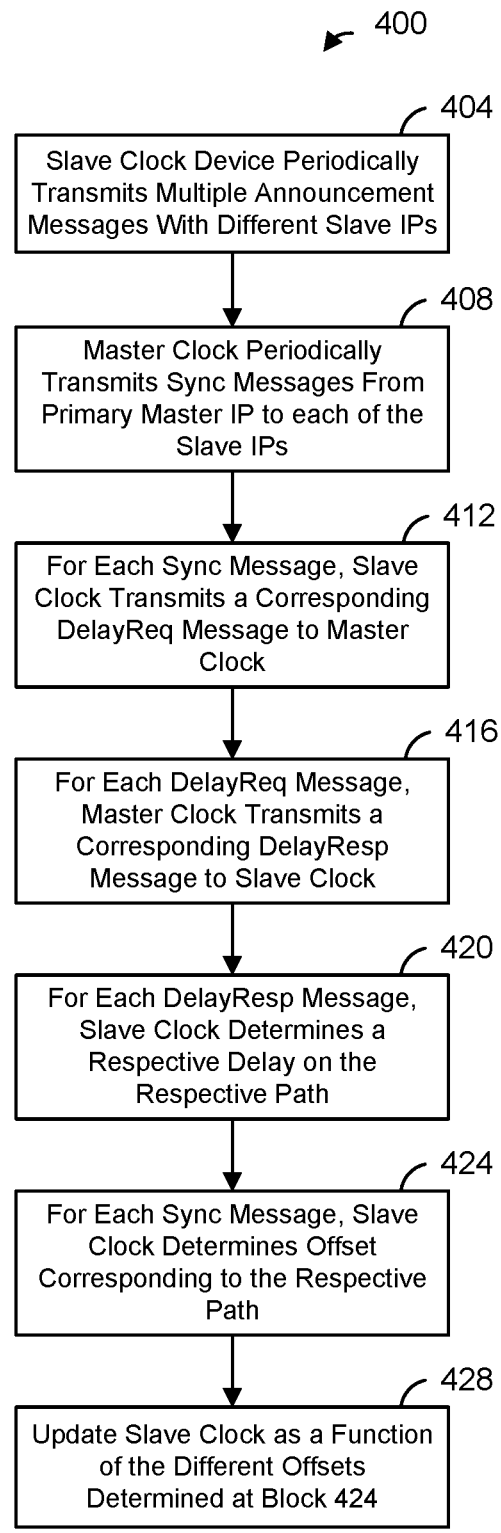
FIG. 4 is a flow diagram of an example method for maintaining a slave clock using multiple clock signals received from a master clock via multiple paths in a network, according to an embodiment.

FIG. 4 is a flow diagram of an example method 400 for maintaining a slave clock using multiple clock signals received from a master clock via multiple paths in a network, according to an embodiment. The system 100 of FIG. 1A and/or the system 180 of FIG. 1B is configured to implement the method 400, in an embodiment, and the method 400 is discussed with reference to FIGS. 1A and 1B for explanatory purposes. In other embodiments, however, the method 400 is implemented by another suitable system.

FIG. 4 is described, for explanatory purposes, with reference to messages similar to messages utilized in the precision time protocol (PTP). In other embodiments, messages similar to messages utilized in the network time protocol (NTP) are utilized.

Multiple IP addresses (slave IP addresses) are associated with the slave clock, and one of the slave IP addresses is designated as a primary slave IP address, in an embodiment. Similarly, at least one IP address (master IP address) is associated with the master clock. One of the at least one master IP addresses is designated as a primary master IP address, in an embodiment. If there is only one master IP address, the single master IP address is designated as the primary slave IP address, in an embodiment.

At block 404, the slave clock device 108 periodically transmits multiple announcement messages, each announcement message in the multiple announcement messages having a different slave IP address, in an embodiment. The multiple announcement messages are received by the master clock device 104, and the master clock device 104 notes the different slave IP addresses included in the multiple announcement messages.

At block 408, after the master clock device 104 periodically transmits multiple synchronization messages to the slave clock device 108, each synchronization message in the multiple synchronization messages having one of the multiple slave IP addresses from the multiple announcement messages of block 404, in an embodiment. Each synchronization message is transmitted via a different path, and each slave IP address corresponds to a corresponding one of the different paths, in an embodiment. Each synchronization message includes the primary master IP address, in an embodiment. Each synchronization message includes a timestamp corresponding to a value of the master clock when the synchronization message was transmitted by the master clock device 104, in an embodiment.

At block 412, the slave clock device 108 transmits to the master clock device 104 a delay request message responsive to each synchronization message. Each delay request message includes one of the multiple slave IP addresses.

At block 416, the master clock device 104 transmits to the slave clock device 108 a delay response message responsive to each delay response message from the slave clock device 108. Each delay response message includes one of the multiple slave IP addresses, and each delay response message is transmitted via a different path, in an embodiment. Each delay response message includes the primary master IP address, in an embodiment.

At block 420, the slave clock device 108 receives the multiple delay response messages transmitted by the master clock device 104 at block 416. For each delay response message received at block 420, the slave clock device 108 determines a delay corresponding to the path via which the delay response message was received. In an embodiment, the slave clock device 108 determines the delay based on (i) when the delay response message was received at the slave clock device 108, and (ii) when the corresponding delay request message (block 412) was transmitted by the slave clock device 108. For each delay response message received at block 420, the slave clock device 108 determines the path via which the message was received based on the slave IP address in the message, in an embodiment.

At block 424, the slave clock device 108 receives multiple synchronization messages periodically transmitted by the master clock device 104 at block 408. For each synchronization message received by the slave clock device 108, the slave clock device 108 determines a clock offset corresponding to the path via which the synchronization message was received. In an embodiment, the slave clock device 108 determines the clock offset based on (i) a value of the slave clock when the synchronization message was received at the slave clock device 108, (ii) the master clock time stamp in the synchronization message, and (iii) the delay for the corresponding path (block 420). For each synchronization message received by the slave clock device 108, the slave clock device 108 determines the path via which the message was received based on the slave IP address in the message, in an embodiment.

At block 428, the slave clock device 108 updates the slave clock as a function of the different offsets, determined at block 424, corresponding to the different paths, in an embodiment.

In some embodiments, multiple master IP addresses are associated with the master clock, where one of the at least one master IP addresses is designated as a primary master IP address, in an embodiment. In some embodiments, respective synchronization messages for each {master IP, slave IP} address pair are periodically transmitted by the master clock device 104 at block 408, and the different {master IP, slave IP} address pairs correspond to different paths. In some embodiments, the slave clock device 108 transmits, at block 412, a corresponding delay request message to the master IP address included in the delay request message. In some embodiments, for each delay response message received at block 420, the slave clock device 108 determines the path via which the message was received based on the {master IP, slave IP} address pair in the message. In some embodiments, for each synchronization message received by the slave clock device 108, the slave clock device 108 determines the path via which the message was received based on the {master IP, slave IP} address pair in the message.

Figure 5:
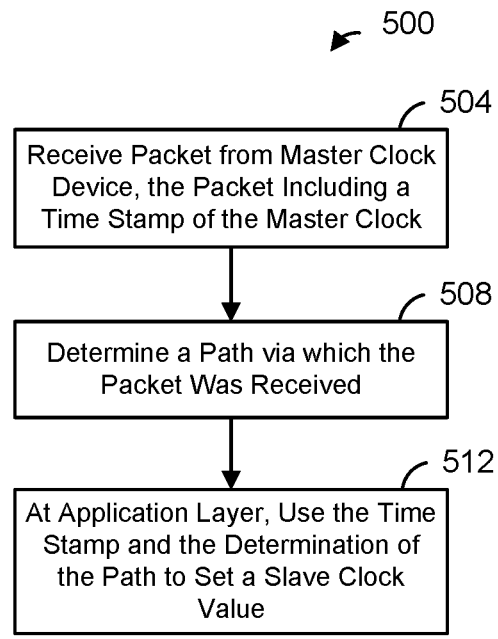
FIG. 5 is a flow diagram of an example method for maintaining a slave clock using a packet received from a master clock, according to an embodiment.

FIG. 5 is a flow diagram of an example method 500 for setting a slave clock, according to an embodiment. The slave clock device 108 of FIG. 1A and/or FIG. 1B is configured to implement the method 500, in an embodiment, and the method 500 is discussed with reference to FIGS. 1A and 1B for explanatory purposes. In other embodiments, however, the method 500 is implemented by another suitable device.

At block 504, a packet is received at the slave clock device 108, the packet having been transmitted by the master clock device 104. The packet includes a time stamp corresponding to the master clock. In an embodiment, the time stamp corresponds to a value of the master clock when the packet was transmitted by the master clock.

At block 508, the slave clock device 108 determines via which one of multiple paths the packet was received at block 504. In an embodiment, the slave clock device 108 determines via which one of the multiple paths based on an address in the packet. In an embodiment, the slave clock device 108 determines via which one of the multiple paths based on a slave IP address in the packet. In an embodiment, the slave clock device 108 determines via which one of the multiple paths based on a pair of addresses in the packet. In an embodiment, the slave clock device 108 determines via which one of the multiple paths based on a {master IP, slave IP} address pair in the packet.

In an embodiment, the clock synchronization module 150 of the slave clock device 108 is configured to determine via which one of multiple paths the packet was received at block 504. In an embodiment, some other module of the slave clock device 108 is configured to determine via which one of multiple paths the packet was received at block 504. In some embodiments, the module implementing block 508 operates at the application layer in the multi-layer communication protocol stack (e.g., the TCP/IP protocol stack), and/or operates at another suitable layer at least at a fourth layer in a multi-layer communication protocol stack (e.g., corresponding to the OSI model). In an embodiment, the module implementing block 508 is an application layer module and/or operates at a fourth layer or above in a multi-layer communication protocol stack, and also determines via which one of multiple network paths the packet was received at block 504. In other embodiments, the module implementing block 508 operates at a layer below the application layer and/or below the fourth layer in the multi-layer protocol stack. For example, in some embodiments, the module implementing block 508 operates at the IP layer or at Layer-3 in a multi-layer protocol stack. As another example, in some embodiments, the module implementing block 508 operates at the MAC layer or at Layer-2 in a multi-layer protocol stack.

At block 512, the slave clock device 108 uses the path information determined at block 508 and the time stamp in the packet received at block 504 to set the slave clock value. In an embodiment, block 512 is performed at the application layer in a multi-layer communication protocol stack, and/or operates at another suitable layer at least at the fourth layer in the multi-layer communication protocol stack, and also utilizes network path information to set the slave clock value. In an embodiment, block 512 is implemented by the clock synchronization module and/or the clock module 160. In other embodiments, the module implementing block 512 operates at a layer below the application layer and/or below the fourth layer in the multi-layer protocol stack. For example, in some embodiments, the module implementing block 512 operates at the IP layer or at Layer-3 in a multi-layer protocol stack. As another example, in some embodiments, the module implementing block 512 operates at the MAC layer or at Layer-2 in a multi-layer protocol stack.

In some embodiments, setting the slave clock value at block 512 is implemented according to the various techniques discussed above with respect to FIGS. 1, 2A, 2B, and 3. For example, different clock results corresponding to the plurality of different communication paths through the network 112 are determined and utilized to set the slave clock as discussed above, in some embodiments.

Figure 6:
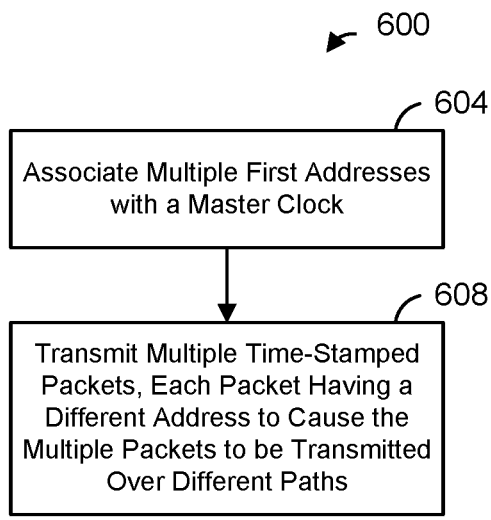
FIG. 6 is a flow diagram of an example method for facilitating determining clock values across a network, according to an embodiment.

FIG. 6 is a flow diagram of an example method 600 for facilitating determining clock values across a network, according to an embodiment. The master clock device 104 of FIG. 1A and/or FIG. 1B is configured to implement the method 600, in an embodiment, and the method 600 is discussed with reference to FIGS. 1A and 1B for explanatory purposes. In other embodiments, however, the method 600 is implemented by another suitable device.

At block 604, multiple first addresses are associated with the master clock. For example, multiple IP addresses (master IP addresses) are associated with the master clock by the clock module 120, in an embodiment.

At block 608, multiple time-stamped packets are transmitted by the master clock device 104 to the slave clock device 108, where each packet includes a different one of the multiple addresses of block 604. The different master IP addresses in the multiple time-stamped packets cause, at least partially, the multiple time-stamped packets to be transmitted over different paths in the network 112. In some embodiments, the multiple packets include multiple slave IP addresses, and the different {master IP, slave IP} address pairs cause, at least partially, the multiple time-stamped packets to be transmitted over different paths in the network 112.

Figure 7:
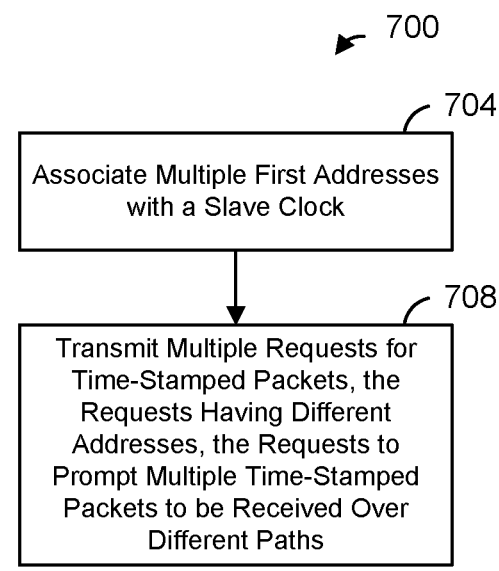
FIG. 7 is a flow diagram of another example method for facilitating determining clock values across a network, according to an embodiment.

FIG. 7 is a flow diagram of an example method 700 for facilitating determining clock values across a network, according to an embodiment. The slave clock device 108 of FIG. 1A and/or FIG. 1B is configured to implement the method 700, in an embodiment, and the method 700 is discussed with reference to FIGS. 1A and 1B for explanatory purposes. In other embodiments, however, the method 700 is implemented by another suitable device.

At block 704, multiple first addresses are associated with the slave clock. For example, multiple IP addresses (slave IP addresses) are associated with the slave clock by the clock module 160, in an embodiment.

At block 708, multiple requests are transmitted to the master clock device 104, the multiple requests including the multiple addresses to cause the master clock device 104 to transmit multiple time-stamped packets via different paths in the network 112, so that the multiple time-stamped packets are received by the slave clock device 108 via different paths in the network 112. The different slave IP addresses in the requests cause, at least partially, the multiple time-stamped packets to be received over different paths in the network 112. In some embodiments, the multiple packets include multiple master IP addresses, and the different {master IP, slave IP} address pairs cause, at least partially, the multiple time-stamped packets to be received over different paths in the network 112.

Figure 8A:
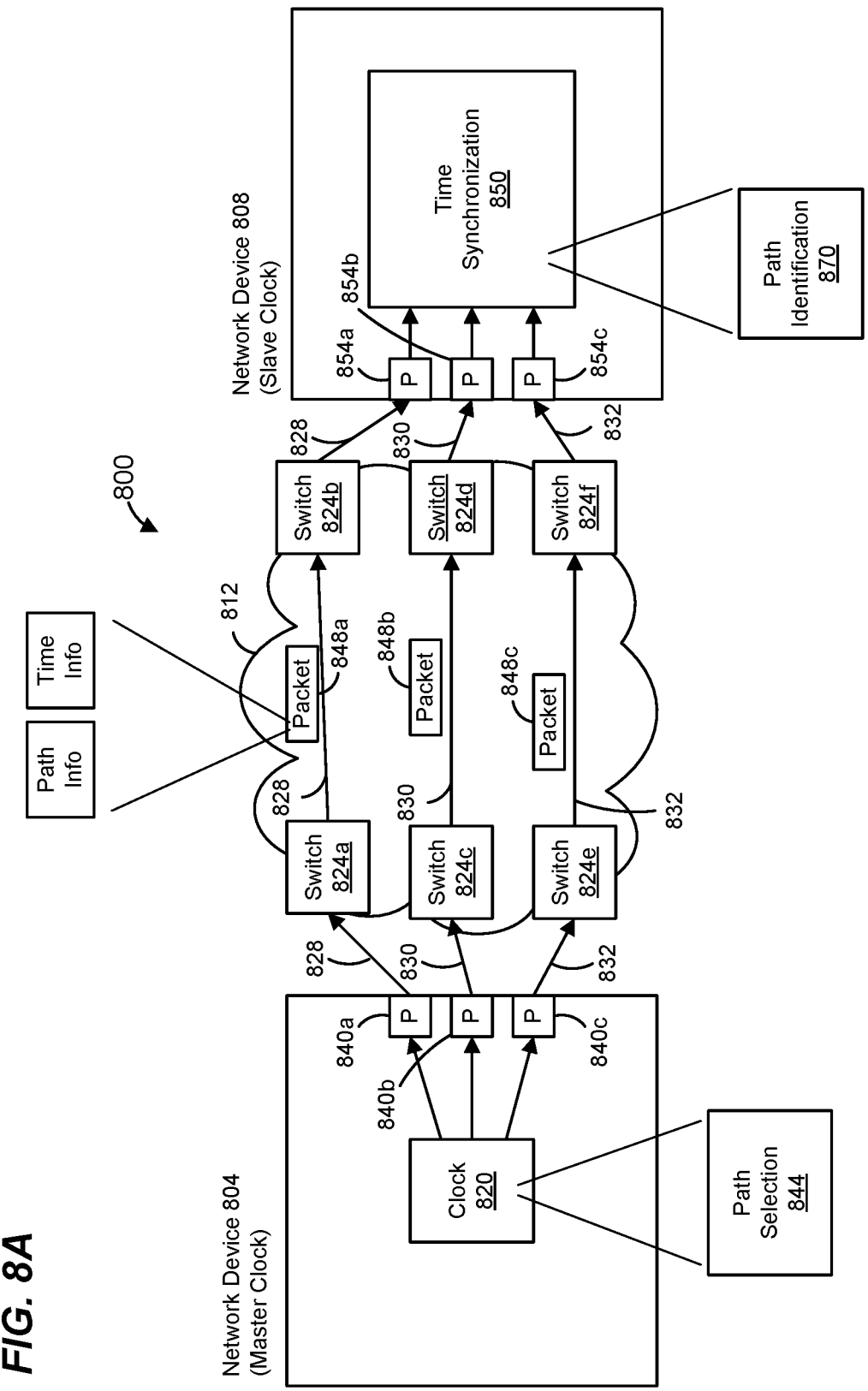
FIG. 8A is a block diagram of another example system in which a slave clock is maintained based on a master clock and based on signals transmitted by the master clock via multiple paths in a network, according to an embodiment.

FIG. 8 is a block diagram of another example system 800, according to an embodiment, having a first network device 804 communicatively coupled to a second network device 808 via a communication network 812. The first network device 804 implements a master clock, and the first network device 804 is sometimes referred to herein as the master clock device 804. The second network device 808 implements a slave clock, and the second network device 808 is sometimes referred to herein as the slave clock device 808.

The master clock device 804 includes a clock module 820 configured to maintain the master clock. In an embodiment, the master clock is a time-of-day clock. In another embodiment, the master clock is a counter not directly linked to a time-of-day. In an embodiment, the clock module 820 includes or utilizes a counter circuit that maintains the master clock. In an embodiment, the clock module 820 is an application layer module operating at an application layer in a multi-layer communication protocol stack. In an embodiment, the multi-layer communication protocol stack (e.g., the Transport Control Protocol/Internet Protocol (TCP/IP) protocol suite) comprises a link layer, an Internet layer, a transport layer, and the application layer, where the application layer is above the transport layer, the Internet layer, and the link layer in the protocol stack. In another embodiment, the multi-layer communication protocol stack (e.g., corresponding to the Open Systems Interconnection (OSI) model) comprises a physical layer, a data link layer, a network layer, a transport layer, a session layer, a presentation layer, and the application layer, where the application layer is above the presentation layer, the session layer, the transport layer, the network layer, the data link layer, and the physical layer in the protocol stack. In other embodiments, the clock module 820 operates at another suitable layer at least at a fourth layer in a multi-layer communication protocol stack. In other embodiments, the clock module 820 operates at another suitable layer in a multi-layer communication protocol stack, such as at a second or third layer.

The clock module 820 is configured to cause a plurality of time-stamped packets to be transmitted from the master clock device 804 to the slave clock device 808 via respective different communication paths through the network 812. The plurality of time-stamped packets are time-stamped with one or more values of the master clock maintained by the clock module 820, in an embodiment.

The network 812 comprises one or more of a private network, a public network, a backbone network, a provider network, the Internet, etc. The network 812 comprises a plurality of switches 824, in an embodiment, and a first path 828 corresponds to a link from the switch 824a to the switch 824b. A second path 830 corresponds to a link from the switch 824c to the switch 824d. A third path 832 corresponds to a link from the switch 824e to the switch 824f.

The clock module 820 is configured to cause a first time-stamped packet to be transmitted from the master clock device 804 to the slave clock device 808 via the path 828, to cause a second time-stamped packet to be transmitted from the master clock device 804 to the slave clock device 808 via the path 830, and to cause a third time-stamped packet to be transmitted from the master clock device 804 to the slave clock device 808 via the path 832. In an embodiment, the master clock device 804 includes multiple ports 840, and the clock module 820 is configured to cause the first time-stamped packet to be transmitted via the port 840a, the second time-stamped packet to be transmitted via the port 840b, and the third time-stamped packet to be transmitted via the port 840c. In other embodiments and/or scenarios, each of at least some of the time-stamped packets are transmitted via the same port 840. Although three ports 840 are illustrated in FIG. 8, in other embodiments, the master clock device 804 includes a suitable number of ports 840 greater than or less than three. In one embodiment, the master clock device 804 includes only a single port 840, and path diversity is entirely provided by the network 812. For example, in locally administered networks 812, switches/routers can be configured to utilize different paths when transmitting packets destined for the same endpoint device but including different header information (e.g., source addresses, destination addresses, Layer 4 ports, etc.), in some embodiments. As another example, public and/or provider networks, at least some switches/routers in the network 812 apply load balancing techniques in which packets destined for the same endpoint device are directed along different paths based upon different header information in the packets (e.g., source addresses, destination addresses, Layer 4 ports, etc.), in some embodiments. Thus, to cause the network 812 to transmit packets to the slave clock device 808 via different paths, the master clock device 804 varies header information in the packets (e.g., source addresses, destination addresses, Layer 4 ports, etc.), in some embodiments.

The clock module 820 includes a path selection module 844 configured to cause time-stamped packets to be transmitted via selected paths in the network, in an embodiment. In some embodiments, the path selection module 844 is configured to cause path information to be added to the time-stamped packets, where the path information indicates the network path via which the packet is transmitted.

For example, in some embodiments, the path selection module 844 is configured to cause a virtual local area network identifier (VID) to be added to a packet, where the VID indicates the network path via which the packet is transmitted. For example, the Multiple Spanning Tree Protocol (MSTP), defined in the Institute for Electrical and Electronics Engineers (IEEE) Standard 802.1s and the IEEE Standard 802.1Q-2005, specifies a separate Spanning Tree for each VLAN group.

With Shortest Path Bridging—VID (SPBV), switches 824 in the network 812 direct a packet through a particular path through the network 812 according to a VID in the packet. Thus, when utilizing SPBV, the VID is an indication, in the packet, of the path via which the packet is transmitted, in an embodiment. Similarly, when utilizing SPBV, the VID is part of a combination including other information in the packet (an indication) of the path via which the packet is transmitted, in another embodiment. Similarly, in Shortest Path Bridging—MAC (SPBM), switches 824 in the network 812 direct a packet through a particular path in the network 812 according to a VID in the packet. Thus, when utilizing SPBM, the VID is an indication, in the packet, of the path via which the packet is transmitted, in an embodiment. Similarly, when utilizing SPBM, the VID is part of a combination including other information in the packet (the combination being an indication) of the path via which the packet is transmitted, in another embodiment. When mac-in-mac encapsulation is utilized, the VID utilized to indicate the network path is a backbone VID (B-VID), and switches 824 in the network 812 direct a packet through a particular path through the network 812 according to the B-VID, in an embodiment. Thus, when utilizing mac-in-mac encapsulation, the B-VID is an indication, in the packet, of the path via which the packet is transmitted, in an embodiment. Similarly, when utilizing mac-in-mac encapsulation, the VID is part of a combination including other information in the packet (an indication) of the path via which the packet is transmitted, in another embodiment.

In some embodiments, the path information added to the time-stamped packets includes a VID and one or more addresses corresponding to a layer below an Internet Protocol (IP) layer in a multi-layer protocol stack. For example, the path information added to the time-stamped packets includes a VID and one or more Layer-2 addresses, in an embodiment. When mac-in-mac encapsulation is utilized, the path information added to the time-stamped packets includes a B-VID and a backbone destination address (B-DA), and switches 824 in the network 812 direct a packet through a particular path through the network 812 according to B-VID and the B-DA in the packet, in an embodiment.

In some embodiments, the path information added to the time-stamped packets includes one or more IP addresses. For example, as discussed above, the master clock device 804 is associated with multiple IP addresses, and/or the slave clock device 808 is associated with multiple IP addresses, and path selection is achieved, at least in part, by selection of the master IP address and/or the slave IP address. For instance, the network 812 is engineered to route packets with different slave IP addresses along different paths, in an embodiment. In another embodiment, the network 812 is engineered to route packets with different master IP addresses along different paths. In another embodiment, the network 812 is engineered to route packets with different master IP address/slave IP address pairs along different paths.

In other embodiments, the master clock device 804 and/or the slave clock device 808 are configured to utilize Traceroute-based path discovery to determine paths that correspond to different master IP addresses, slave IP address, and/or master IP address/slave IP address pairs. "Paris traceroute" and "TraceFlow" are examples of tools that discover the paths between two points in the network. Other suitable tools for discovering the paths between two points in a network are utilized in other embodiments.

Thus, the clock module 820 causes a plurality of packets 848 to be transmitted through the network 812 along different paths 828, 830, 832. For example, the packet 848a is transmitted along the path 828; the packet 848b is transmitted along the path 830; and the packet 848c is transmitted along the path 832. Each packet 848 includes respective path information (e.g., Layer-2 information such as a VLAN-ID, one or more addresses, etc., and/or Layer-3 or higher information such as one or more IP addresses, etc.) and respective time information (e.g., a time stamp), in some embodiments. As discussed above, the respective path information indicates the path via which each packet 848 is transmitted.

A time synchronization module 850 of the slave clock device 808 is configured to process respective path information, and respective time information included in each of at least some of the packets 848, and to determine a system time clock responsive to the processing of the path information and the time information. For example, in an embodiment, the time synchronization module 850 is configured to maintain respective clock information for each path, and to use at least some of the clock information for the different paths to determine the system time clock. For example, the time synchronization module 850 is configured to maintain first clock information corresponding to the path 828, second clock information corresponding to the second path 830, and third clock information corresponding to the third path 832.

In an embodiment, the slave clock device 808 includes multiple ports 854, and the packet 848a is received via the port 854a; the packet 848b is received via the port 854b; and the packet 848c is received via the port 854c. In other embodiments and/or scenarios, each of at least some of the packets 848 are received via the same port 854. Although three ports 854 are illustrated in FIG. 8, in other embodiments, the slave clock device 808 includes a suitable number of ports 154 less than or greater than three. In an embodiment, the slave clock device 808 includes only a single port 854.

The time synchronization module 850 is configured to update respective clock information for each path based on the time information in the respective time-stamped packet 848 transmitted via the respective path. In an embodiment, the clock information for each path maintained by the time synchronization module 850 comprises a respective offset between the master clock maintained at the master clock device 804 and a slave clock maintained at the slave clock device 808.

In another embodiment, the clock information for each path generated by the time synchronization module 150 comprises a respective clock value (e.g., a time-of-day value) corresponding to the master clock maintained at the master clock device 804. For example, the time synchronization module 850 is configured to determine each clock value based on the respective time stamp in the respective time-stamped packet 848 transmitted via the respective path, in an embodiment.

In an embodiment, the time synchronization module 850 is an application layer module operating at the application layer in the multi-layer communication protocol stack. In other embodiments, the clock synchronization module 850 operates at another suitable layer at least at a fourth layer in a multi-layer communication protocol stack. In other embodiments, the clock synchronization module 850 is at another suitable layer below an application layer and/or operates at a suitable layer below the fourth layer in the multi-layer communication protocol stack.

In an embodiment, the time synchronization module includes a path identification module 870. The path identification module 870 is configured to analyze path information in each packet 848 to identify that the packet 848 was transmitted via a particular path. For instance, in an embodiment, the path identification module 870 is configured to analyze Layer-2 information in the packet 848 to identify that the packet 848 was transmitted via a particular path. As an illustrative example, in an embodiment, the path identification module 870 is configured to analyze a VLAN ID in the packet 848 to identify that the packet 848 was transmitted via a particular path. For example, different VLAN IDs indicate a different one of the paths 828, 830, 832, in an embodiment. In other embodiments, the path identification module 870 is configured to analyze a VLAN ID in the packet 848 as well as other Layer-2 information (e.g., one or more addresses) to identify that the packet 848 was transmitted via a particular path.

In another embodiment, the path identification module 870 is configured to analyze Layer-3 information in the packet 848 to identify that the packet 848 was transmitted via a particular path. As an illustrative example, in an embodiment, the path identification module 870 is configured to analyze at least an IP address in the packet 848 to identify that the packet 848 was transmitted via a particular path. For example, different source IP addresses, destination IP addresses, or source IP/destination IP paires indicate a different one of the paths 828, 830, 832, in various embodiment. In other embodiments, the path identification module 870 is configured to analyze one or more IP addresses in the packet 848 as well as other Layer-3 or higher information to identify that the packet 848 was transmitted via a particular path.

The time synchronization module 850 in the slave clock device 808 is configured to maintain the slave clock, in some embodiments. In an embodiment, the slave clock is a time-of-day clock. In another embodiment, the slave clock is a counter not directly linked to a time-of-day. In an embodiment, the time synchronization module 850 includes or utilizes a counter circuit that maintains the slave clock. In some embodiments in which the time synchronization module 850 is configured to maintain respective path-dependent clocks, the time synchronization module 850 is configured to select one of the path-dependent clocks as the slave clock rather than maintaining a separate slave clock.

The time synchronization module 850 is configured to determine the slave clock value using the path-dependent clock information using techniques such as described above, in some embodiments. For example, in an embodiment, the time synchronization module 850 is configured to determine the slave clock value at least by mathematically combining at least some of the path-dependent clock information. In another embodiment, the time synchronization module 850 is configured to determine the slave clock value at least by selecting one of a plurality of path-dependent clock results. In another embodiment, the time synchronization module 850 is configured to determine the slave clock value at least by (i) combining at least some of the plurality of path-dependent clock results in some situations, and (ii) selecting one of the plurality of path-dependent clock results. In another embodiment, the clock module time synchronization module 850 is configured to determine the slave clock value at least by (i) selecting a subset of the plurality of path-dependent clock results, and (ii) combining the subset of path-dependent clock results.

Figure 8B:
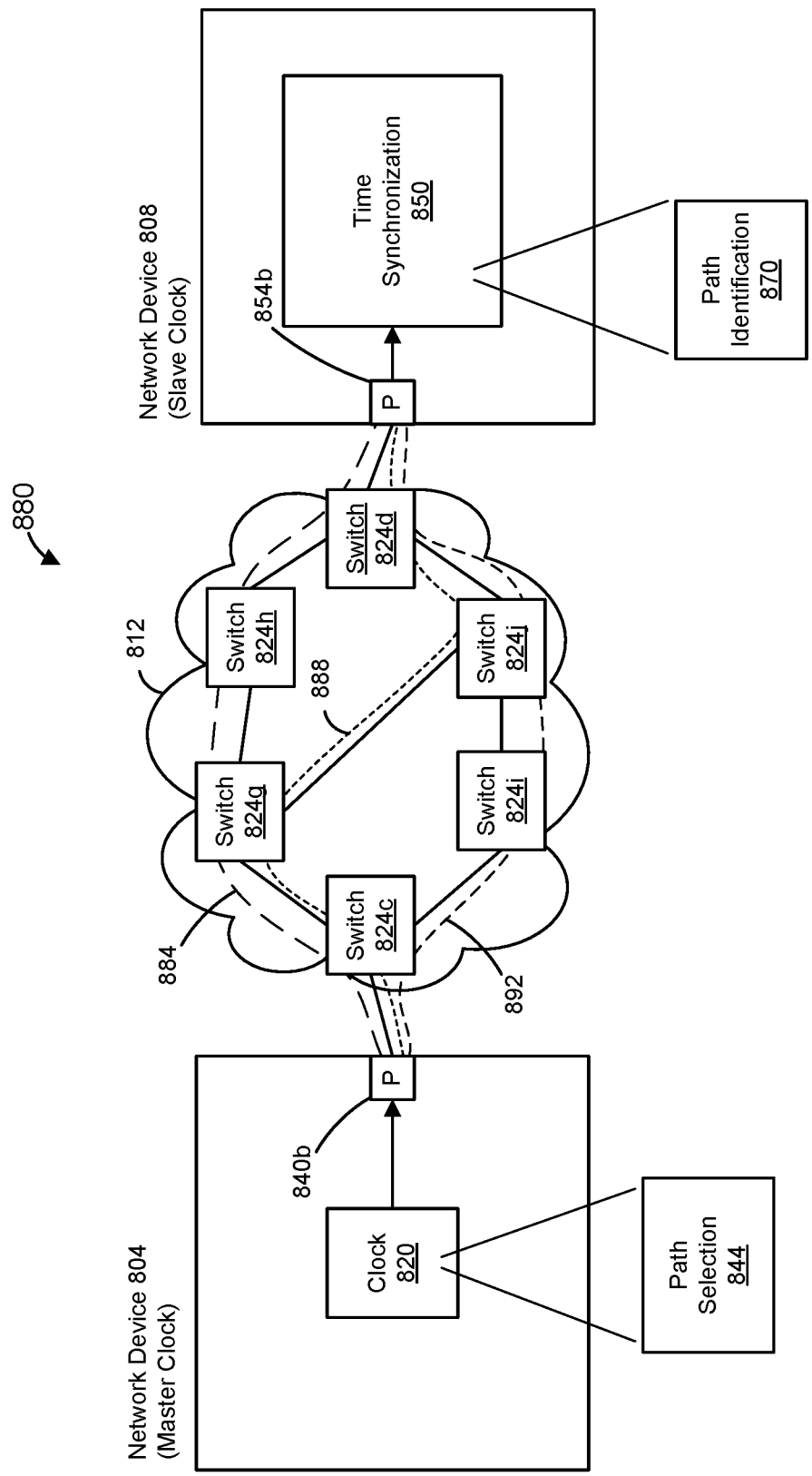
FIG. 8B is a block diagram of another example system in which a slave clock is maintained based on a master clock and based on signals transmitted by the master clock via multiple paths in a network, according to an embodiment.

FIG. 8B is a block diagram of another example system 880 which the master clock device 804 includes only a single port 840b and the slave clock device 808 includes only a single port 854b. Path diversity is entirely provided by the network 812. As discussed above, for example, switches 824 are configured to utilize different paths 884, 888, 892 when transmitting packets destined for the same endpoint device but including different header information (e.g., source addresses, destination addresses, Layer 4 ports, etc.), in some embodiments. As another example, switches 824 apply load balancing techniques in which packets destined for the same endpoint device are directed along different paths 884, 888, 892 based upon different header information in the packets (e.g., source addresses, destination addresses, Layer 4 ports, etc.), in some embodiments. Thus, to cause the network 812 to transmit packets to the slave clock device 808 via different paths 884, 888, 892, the master clock device 804 varies header information in the packets (e.g., source addresses, destination addresses, Layer 4 ports, etc.), in some embodiments.

Figure 9:
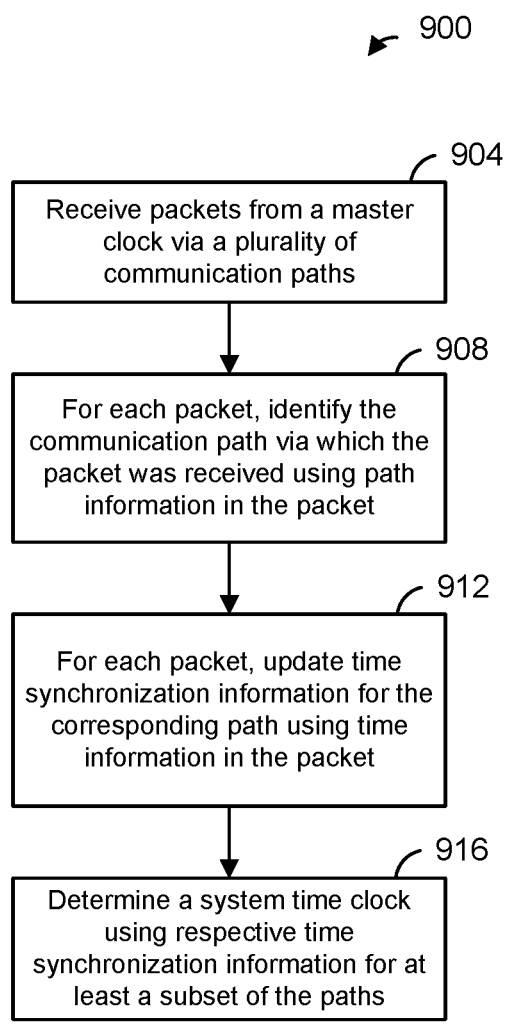
FIG. 9 is a flow diagram of another example method for facilitating determining clock values across a network, according to an embodiment.

FIG. 9 is a flow diagram of an example method 900 for facilitating determining clock values across a network, according to an embodiment. The slave clock device 808 of FIG. 8A and/or FIG. 8B is configured to implement the method 900, in an embodiment, and the method 900 is discussed with reference to FIGS. 8A and 8B for explanatory purposes. In other embodiments, however, the method 900 is implemented by another suitable device, such as the slave clock device 808 of FIG. 8A and/or FIG. 8B.

At block 904, time synchronization packets from a master clock are received via a plurality of communication paths. For example, the time synchronization packets 848 are received via the paths 828, 830, and 832. Each time synchronization packet includes path information and time information. The path information (e.g., Layer-2 information such as a VLAN-ID, one or more addresses, etc., and/or Layer-3 or higher information such as one or more IP addresses, etc.) indicates the path via which the packet was transmitted, in an embodiment. The time information is a time stamp, a clock value, etc., corresponding to the master clock, in some embodiments.

At block 908, for each packet received at block 904, the path via which the packet was transmitted is identified using the path information in the packet. The path is identified using one or more of (i) a VLAN ID, (ii) a Layer-2 destination address, (iii) a Layer-2 source address, (iv) a source IP address, and/or (v) a destination IP address in the packet, in various embodiments. For example, the packet 848a is identified as being transmitted via path 828 by analyzing path information in the packet 848a; the packet 848b is identified as being transmitted via path 830 by analyzing path information in the packet 848b; and the packet 848c is identified as being transmitted via path 832 by analyzing path information in the packet 848c.

At block 912, respective time synchronization information for the paths identified at block 908 are updated using respective time information in the packets. For example, time synchronization information corresponding to path 828 is updated using time information in the packet 848*a*; time synchronization information corresponding to path 830 is updated using time information in the packet 848*b*; and time synchronization information corresponding to path 832 is updated using time information in the packet 848*c*.

At block 916, a system time clock is determined using at least a subset of the time synchronization information for the different paths determined at block 912. Techniques such as described above are used to determine the system time clock using at least a subset of time synchronization information for the different paths are utilized, in some embodiments.

In an embodiment, an algorithm similar to the Best Master Clock Algorithm (BMCA) is utilized. For example, the slave clock device is configured to run BMCA to find the best instances of the same master clock, the different instances corresponding to different paths. The slave clock then utilizes the selected instances of the master using techniques such as described above.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any tangible, non-transitory computer readable memory such as a magnetic disk, an optical disk, a random access memory, a read only memory, a flash memory, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device, etc.

While various embodiments have been described with reference to specific examples, which are intended to be illustrative only and not to be limiting, changes, additions and/or deletions may be made to the disclosed embodiments without departing from the scope of the claims.

What is claimed is:

1. A network device, comprising:
one or more ports coupled to a network, the one or more ports configured to receive a plurality of time synchronization packets from a master clock device, the plurality of time synchronization packets for synchronization of a system time clock in the network device with the master clock device;
a path determination module implemented on one or more integrated circuit devices configured to identify, based on respective path information included in each of at least some of the plurality of time synchronization packets, particular communication paths among two or more communication paths between the master clock device and the network device, via which the respective time synchronization packets traveled from the master clock device to the network device;
a time synchronization module implemented on the one or more integrated circuit devices configured to determine, based on (i) respective time information included in the at least some of the plurality of time synchronization packets and (ii) the identifications of the particular communication paths via which the respective time synchronization packets traveled from the master clock device to the network device, respective clock values for the two or more communication paths, and
a clock module implemented on the one or more integrated circuit devices, the clock module configured to receive the respective clock values determined for the two or more communication paths, and
determine a value of the system time clock based on at least a subset of the received respective clock values determined for the two or more communication paths.

2. The network device of claim 1, wherein the clock module is configured to operate at a layer higher than a transport layer of a multi-layer communication protocol stack.

3. The network device of claim 1, wherein:
the respective path information includes a respective set of one or more addresses; and
the path determination module is configured to identify, using the respective set of one or more addresses, a particular communication path via which a respective time synchronization packet, among the at least some of the plurality of time synchronization packets, traveled from the master clock device to the network device.

4. The network device of claim 3, wherein:
the respective set of one or more addresses includes one or both of (i) a respective source IP address and (i) a respective destination IP address; and
the path determination module is configured to identify, using one or both of (i) the respective source IP address and (ii) the respective destination IP address, the particular communication path via which the respective time synchronization packet traveled from the master clock device to the network device.

5. The network device of claim 1, wherein:
the respective path information includes a respective virtual local area network identifier (VLAN ID); and
the path determination module is configured to identify, using the respective VLAN ID, the particular communication path via which the respective time synchronization packet traveled from the master clock device to the network device.

6. The network device of claim 1, wherein:
the respective path information includes a respective Layer-2 address; and
the path determination module is configured to identify, using the Layer-2 address, the particular communication path via which the respective time synchronization packet traveled from the master clock device to the network device.

7. The network device of claim 1, wherein:
the respective path information includes a respective user datagram protocol (UDP) port field; and
the path determination module is configured to identify, using the respective UDP port field, a particular communication path via which a respective time synchronization packet, among the at least some of the plurality of time synchronization packets, traveled from the master clock device to the network device.

8. The network device of claim 1, wherein:
the respective path information includes a dedicated path identifier (ID) field in the respective time synchronization packet; and
the path determination module is configured to identify, using the respective dedicated path ID field, a particular communication path via which a respective time synchronization packet, among the at least some of the plurality of time synchronization packets, traveled from the master clock device to the network device.

9. A method, comprising:
receiving a plurality of time synchronization packets from a master clock device over two or more different communication paths via one or more ports coupled to a network, wherein time synchronization packets, of the plurality of time synchronization packets, are for synchronization of a system time clock in a network device with the master clock device, and wherein each time synchronization packet includes (i) respective path information, and (ii) respective time information, wherein the respective path information indicates a respective communication path in the network via which the respective time synchronization packet was received;
identifying, based on respective path information included in each of at least some of the plurality of time synchronization packets, particular communication paths among the two or more different communication paths between the master clock device and the network device, via which the respective time synchronization packets traveled from the master clock device to the network device;
determining, based on (i) respective time information included in the at least some of the plurality of time synchronization packets and (ii) the identifications of the particular communication paths via which the respective time synchronization packets traveled from the master clock device to the network device, respective clock values for the two or more communication paths; and
determining a value of the system time clock based on at least a subset of the respective clock values determined for the two or more communication paths.

10. The method of claim 9, wherein determining the value of the system clock comprises determining the value of the system clock at a clock module configured to operate at a layer higher than a transport layer of a multi-layer communication protocol stack.

11. The method of claim 9, wherein:
the respective path information includes a respective set of one or more addresses; and
identifying the particular communication paths includes identifying, using the respective set of one or more addresses, a particular communication path via which a respective time synchronization packet, among the at least some of the plurality of time synchronization packets, traveled from the master clock device to the network device.

12. The method of claim 11, wherein:
the respective set of one or more addresses includes one or both of (i) a respective source IP address and (ii) a respective destination IP address; and
identifying the particular communication path via which the respective time synchronization packet traveled from the master clock device to the network device comprises identifying the particular communication path using one or both of (i) the respective source IP address and (ii) the respective destination IP address.

13. The method of claim 9, wherein:
the respective path information includes a respective virtual local area network identifier (VLAN ID); and
identifying the particular communication path via which the respective time synchronization packet traveled from the master clock device to the network device comprises identifying the particular communication path using the respective VLAN ID.

14. The method of claim 9, wherein:
the respective path information includes a respective Layer-2 address; and
identifying the particular communication path via which the respective time synchronization packet traveled from the master clock device to the network device comprises identifying the particular communication path using the respective Layer-2 address.

15. The method of claim 9, wherein:
the respective path information includes a respective user datagram protocol (UDP) port field; and
identifying the particular communication paths includes identifying, using the respective UDP port field, a particular communication path via which a respective time synchronization packet, among the at least some of the plurality of time synchronization packets, traveled from the master clock device to the network device.

16. The method of claim 9, wherein:
the respective path information includes a dedicated path identifier (ID) field in the respective time synchronization packet; and
identifying the particular communication paths includes identifying, using the respective dedicated path ID field, a particular communication path via which a respective time synchronization packet, among the at least some of the plurality of time synchronization packets, traveled from the master clock device to the network device.

17. The method of claim 9, wherein:
the network device comprises multiple ports coupled to the network; and
identifying the particular communication paths includes identifying, at least in part based on via which one of the multiple ports a respective time synchronization packet, among the at least some of the plurality of time synchronization packets, was received, a particular communication path via which the respective time synchronization packet traveled from the master clock device.

18. A system, comprising:
a first network device including:
one or more first ports coupled to a communication network, and
one or more integrated circuit devices configured to:
generate a plurality of time synchronization packets for synchronization of a system time clock in a network device with a master clock, each time synchronization packet having (i) respective path information, and (ii) respective time information, wherein the respective path information indicates a respective communication path in the communication network via which the respective time synchronization packet is to be transmitted, and
cause the plurality of time synchronization packets to be transmitted (i) via at least one of the one or more first ports, and (ii) via multiple different communication paths in the communication network; and
a second network device communicatively coupled to the first network device via the communication network, the second network device including:
one or more second ports coupled to the communication network, the one or more second ports configured to receive the plurality of time synchronization packets from the first network device, a path determination module implemented on one or more integrated circuit devices configured to identify, based on respective path information included in each of at least some of the plurality of time synchronization packets, particular communication paths among the multiple communication paths, via which the respective time synchronization packets traveled from the first network clock device to the second network device, and a time synchronization module implemented on the one or more integrated circuit devices configured to determine, based on (i) respective time information included in the at least some of the plurality of time synchronization packets and (ii) the identifications of the particular communication paths via which the respective time synchronization packets traveled from the master clock device to the network device, respective clock values for the two or more communication paths, and a clock module implemented on the one or more integrated circuit devices, the clock module configured to receive the respective clock values determined for the two or more communication paths, and determine a value of the system time clock based on at least a subset of the received respective clock values determined for the two or more communication paths.

19. The system of claim 18, wherein the clock module is configured to operate at a layer higher than a transport layer of a multi-layer communication protocol stack.

20. The system of claim 18, further comprising at least a portion of the communication network.

\* \* \* \* \*